(12) United States Patent
Maejima et al.

(10) Patent No.: US 12,049,102 B2
(45) Date of Patent: Jul. 30, 2024

(54) RAILWAY WHEEL

(71) Applicant: NIPPON STEEL CORPORATION, Tokyo (JP)

(72) Inventors: Taketo Maejima, Tokyo (JP); Manabu Kubota, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 617 days.

(21) Appl. No.: 17/276,510

(22) PCT Filed: Sep. 27, 2019

(86) PCT No.: PCT/JP2019/038360
§ 371 (c)(1),
(2) Date: Mar. 16, 2021

(87) PCT Pub. No.: WO2020/067506
PCT Pub. Date: Apr. 2, 2020

(65) Prior Publication Data
US 2022/0032681 A1 Feb. 3, 2022

(30) Foreign Application Priority Data

Sep. 28, 2018 (JP) .................. 2018-183041
Jul. 17, 2019 (JP) .................. 2019-132303

(51) Int. Cl.
C22C 38/02 (2006.01)
B60B 17/00 (2006.01)
(Continued)

(52) U.S. Cl.
CPC .......... *B60B 17/0006* (2013.01); *C21D 6/002* (2013.01); *C21D 6/005* (2013.01);
(Continued)

(58) Field of Classification Search
CPC ..... C22C 38/001; C22C 38/002; C22C 38/02; C22C 38/04; C22C 38/06; C22C 38/12;
(Continued)

(56) References Cited

U.S. PATENT DOCUMENTS

| 5,899,516 A | 5/1999 | Fujimura et al. |
| 2013/0243640 A1* | 9/2013 | Yamamoto .............. C22C 38/20 420/91 |
| 2015/0147224 A1 | 5/2015 | Yamamoto et al. |

FOREIGN PATENT DOCUMENTS

| JP | 09202937 A | 8/1997 |
| JP | H09202937 A * | 8/1997 ............. B60B 17/00 |

(Continued)

OTHER PUBLICATIONS

Nutal, Nicolas et al., "Image Analysis of Pearlite Spheroidization Based on the Morphological Characterization of Cementite Particles"; Imaga Anal Stereol 2010; 29: pp. 91-98.

*Primary Examiner* — S. Joseph Morano
*Assistant Examiner* — Eva L Comino
(74) *Attorney, Agent, or Firm* — Greer, Burns & Crain, Ltd.

(57) ABSTRACT

Provided is a railway wheel which has excellent toughness even if the C content is as high as 0.80% or more. The chemical composition of the railway wheel of the present embodiment consists of: in mass %, C: 0.80 to 1.60%, Si: 1.00% or less, Mn: 0.10 to 1.25%, P: 0.050% or less, S: 0.030% or less, Al: 0.010 to 0.650%, and N: 0.0030 to 0.0200%, with the balance being Fe and impurities, and wherein, in a microstructure of the web part of the railway wheel, an area fraction of pearlite is 85.0% or more, an area fraction of pro-eutectoid cementite is 0.90 to 15.00%, and an average value of a width W of the pro-eutectoid cementite defined by Formula (3) is less than 0.70 μm:

$$W = \tfrac{1}{2} \times (P/2 - ((P/2)^2 - 4A)^{1/2}) \qquad (3)$$

(Continued)

where, in Formula (3), A is an area ($\mu m^2$) of the pro-eutectoid cementite, and P is a circumference length ($\mu m$) of the pro-eutectoid cementite.

8 Claims, 10 Drawing Sheets

(51) Int. Cl.
    *C21D 6/00*     (2006.01)
    *C21D 9/00*     (2006.01)
    *C22C 38/00*     (2006.01)
    *C22C 38/04*     (2006.01)
    *C22C 38/06*     (2006.01)
    *C22C 38/24*     (2006.01)

(52) U.S. Cl.
    CPC ........... *C21D 6/008* (2013.01); *C21D 9/0068* (2013.01); *C22C 38/002* (2013.01); *C22C 38/02* (2013.01); *C22C 38/04* (2013.01); *C22C 38/06* (2013.01); *C22C 38/24* (2013.01); *B60B 2360/102* (2013.01); *C21D 2211/003* (2013.01); *C21D 2211/009* (2013.01)

(58) Field of Classification Search
    CPC ... C22C 38/18; C22C 38/24; C21D 2211/003; C21D 2211/009; C21D 6/002; C21D 6/005; C21D 9/008; C21D 9/0068; C21D 9/34; B60B 17/0003; B60B 17/0006; B60B 2360/10; B60B 2360/102
    See application file for complete search history.

(56) References Cited

FOREIGN PATENT DOCUMENTS

| | | |
|---|---|---|
| JP | 2004204306 A | 7/2004 |
| JP | 2004315928 A | 11/2004 |
| JP | 4949144 B2 | 6/2012 |
| JP | 2012107295 A | 6/2012 |
| JP | 2013231212 A | 11/2013 |

* cited by examiner

| Heat Pattern | |
|---|---|
| HP11 | 950°C30min⇒720°C47min⇒650°C10min |
| HP12 | 950°C30min⇒720°C17min⇒650°C10min |
| HP13 | 950°C30min⇒720°C47min⇒500°C10min |
| HP14 | 950°C30min⇒720°C17min⇒500°C10min |

Test Number 5 (0.90% C Material)

Test Number 8 (1.00% C Material)

| Mark | Optical Microscope Photographic Image | Binarization | Pro-Eutectoid θ Width Average |
|---|---|---|---|
| A | | | 0.52μm |
| B | | | 0.95μm |

RAILWAY WHEEL

This is a National Phase Application filed under 35 U.S.C. § 371, of International Application No. PCT/JP2019/038360, filed Sep. 27, 2019, the contents of which are incorporated by reference.

TECHNICAL FIELD

The present disclosure relates to a railway wheel.

BACKGROUND ART

A railway vehicle travels on a rail constituting a railway track. A railway vehicle includes a plurality of railway wheels. The railway wheel supports the vehicle, keeps in contact with the rail, and rotates to move on the rail. The railway wheel wears due to the contact with the rail. In recent years, for the purpose of increasing the efficiency of railway transportation, attempts have been made to increase the loading weight on the railway vehicle and to increase the speed of the railway vehicle. As a result of that, there is need of improvement of the wear resistance of railway wheels.

Technologies to improve wear resistance of a railway wheel have been proposed in Japanese Patent Application Publication No. H09-202937 (Patent Literature 1), Japanese Patent Application Publication No. 2012-107295 (Patent Literature 2), Japanese Patent Application Publication No. 2013-231212 (Patent Literature 3), and Japanese Patent Application Publication No. 2004-315928 (Patent Literature 4).

The railway wheel disclosed in Patent Literature 1 consists of, in mass %, C: 0.4 to 0.75%, Si: 0.4 to 0.95%, Mn: 0.6 to 1.2%, Cr: 0 to less than 0.2%, P: less than 0.03%, and S: 0.03% or less, with the balance being Fe and other unavoidable impurities. In this railway wheel, a region from the surface of the wheel tread part to a depth of at least 50 mm is composed of a pearlite structure. A production method of a railway wheel of Patent Literature 1 includes a quenching step in which the wheel tread part is cooled in a condition that a cooling curve of the wheel tread part passes through a pearlite forming region in a continuous cooling transformation curve, and resides on the long-time side of the martensite transformation curve.

Wheel steel disclosed in Patent Literature 2 has a chemical composition consisting of, in mass %, C: 0.65 to 0.84%, Si: 0.02 to 1.00%, Mn: 0.50 to 1.90%, Cr: 0.02 to 0.50%, V: 0.02 to 0.20%, S≤0.04%, P≤0.05%, Cu≤0.20%, and Ni≤0.20%, with the balance being Fe and impurities. The chemical composition further satisfies the following relational expression:

[34≤2.7+29.5×C+2.9×Si+6.9×Mn+10.8×Cr+30.3×Mo+44.3×V≤43] and

[0.76×exp(0.05×C)×exp(1.35×Si)×exp(0.38×Mn)×exp(0.77×Cr)×exp(3.0×Mo)×exp(4.6×V)≤25]

Patent Literature 2 states that this wheel steel achieves excellent wear resistance, rolling fatigue resistance, and spalling resistance by satisfying the above described chemical composition and the Formulae.

The wheel steel disclosed in Patent Literature 3 consists of, in mass %, C: 0.65 to 0.84%, Si: 0.4 to 1.0%, Mn: 0.50 to 1.40%, Cr: 0.02 to 0.13%, S: 0.04% or less, V: 0.02 to 0.12%, with the balance being Fe and impurities, wherein Fn1 defined by Formula (1) is 32 to 43, and Fn2 defined by Formula (2) is 25 or less. Here, Formula (1) is represented by Fn1=2.7+29.5C+2.9Si+6.9Mn+10.8Cr+30.3Mo+44.3V, and Formula (2) is represented by Fn2=exp(0.76)×exp(0.05C)×exp(1.35Si)×exp(0.38Mn)×exp(0.77Cr)×exp(3.0Mo)×exp(4.6V). Patent Literature 3 states that the wheel steel achieves excellent wear resistance, rolling fatigue resistance, and spalling resistance when it has the above described chemical composition, and Fn1 and Fn2 satisfy the above described range.

The railway vehicle wheel disclosed in Patent Literature 4 is an integrated railway vehicle wheel composed of steel containing a chemical composition consisting of, in mass %, C: 0.85 to 1.20%, Si: 0.10 to 2.00%, Mn: 0.05 to 2.00%, and further as needed, one or more kinds selected from Cr, Mo, V, Nb, B, Co, Cu, Ni, Ti, Mg, Ca, Al, Zr, and N, with the balance being Fe and other unavoidable impurities, wherein at least a part of the tread and/or the flange surface of the wheel has a pearlite structure. Patent Literature 4 states that the life of the railway vehicle wheel depends on the amount of wear of the tread and the flange surface (paragraph [0002] of Patent Literature 4), and further depends on a heat crack in the tread and the flange surface which is caused by increase in calorific value when brake is applied in a high-speed railway. It also states that when the railway vehicle wheel has the above described configuration, it is possible to suppress wear and heat crack of the tread and the flange surface.

CITATION LIST

Patent Literature

Patent Literature 1: Japanese Patent Application Publication No. H09-202937
Patent Literature 2: Japanese Patent Application Publication No. 2012-107295
Patent Literature 3: Japanese Patent Application Publication No. 2013-231212
Patent Literature 4: Japanese Patent Application Publication No. 2004-315928

Non Patent Literature

Non Patent Literature 1: Nutal N et al., "IMAGE ANALYSIS OF PEARLITE SPHEROIDIZATION BASED ON THE MORPHOLOGICAL CHARACTERIZATION OF CEMENTITE PARTICLES", Imaga Anal Stereol 2010; 29: 91-98. Non Patent Literature 1 sets forth that the average value of the width of pro-eutectoid cementite can be obtained based on the rectangular approximation method (ribbon-like method):

$$W_r = \frac{1}{2} \times (P/2 - ((P/2)^2 - 4A)^{1/2})$$

SUMMARY OF INVENTION

Technical Problem

In the railway wheel proposed in Patent Literature 1, the Cr content is held to be low and an appropriate amount of Si is contained to provide an appropriate hardenability and a property to facilitate obtaining a pearlite structure. However, the railway wheel according to Patent Literature 1 contains 0.4 to 0.75% of C, that is, the wheel is made of a so-called hypo-eutectoid steel. Therefore, there is limitation on improving wear resistance.

In the wheel steels proposed in Patent Literatures 2 and 3, the pearlite structure is strengthened by making V contained in a steel having a C content of 0.65 to 0.84%, thereby improving wear resistance. However, the wheel steels proposed in Patent Literatures 2 and 3 are made of a so-called hypo-eutectoid steel, as well. Therefore, only containing V has its limitation on improvement of wear resistance.

On the other hand, in the railway vehicle wheel proposed in Patent Literature 4, wear resistance is improved by using a hyper-eutectoid steel in which the C content is increased.

By the way, one example of a production method of a railway wheel is as follows. A billet is subjected to hot working to form an intermediate product having a railway wheel shape. The formed intermediate product is subjected to heat treatment (tread quenching). In the tread quenching, the intermediate product is heated, and thereafter the tread and the flange part of the intermediate product are rapidly cooled. As a result of this, a fine pearlite which has high wear resistance is formed in the matrix structure of the near-surface layer of the tread. However, a quenched layer composed of martensite (or martensite and bainite) is formed in a layer above the fine pearlite of the near-surface portion of the tread after tread quenching. The quenched layer is likely to wear during use of a railway wheel. Therefore, after tread quenching, the quenched layer which has been formed at the outer most layer of the tread is removed by cutting such that fine pearlite is exposed to the tread. By the process described so far, a railway wheel is produced.

As described so far, a railway vehicle wheel made of a hyper-eutectoid steel has excellent wear resistance. However, when a railway wheel is produced by the above described production method by using a hyper-eutectoid steel, it has become clear that in contrast to hypo-eutectoid steel, pro-eutectoid cementite is likely to be formed in a railway wheel, for example, in a web part and/or a hub part of the railway wheel. The pro-eutectoid cementite deteriorates toughness of steel.

Particularly, the thickness of the web part is smaller compared with those of the hub part and the rim part. For that reason, deterioration of toughness due to pro-eutectoid cementite may lead to crack damage of a wheel particularly in the web part.

It is an object of the present invention to provide a railway wheel which exhibits excellent toughness even if the C content is as high as 0.80% or more.

Solution to Problem

A railway wheel according to the present disclosure includes:
a rim part,
a hub part, and
a web part which is disposed between the rim part and the hub part and is linked to the rim part and the hub part, wherein
a chemical composition of the railway wheel consists of:
in mass %,
C: 0.80 to 1.60%,
Si: 1.00% or less,
Mn: 0.10 to 1.25%,
P: 0.050% or less,
S: 0.030% or less,
Al: 0.010 to 0.650%,
N: 0.0030 to 0.0200%,
Cr: 0 to 0.60%, and
V: 0 to 0.12%, with
the balance being Fe and impurities, and wherein
in a microstructure of the web part of the railway wheel,
an area fraction of pearlite is 85.0% or more, an area fraction of pro-eutectoid cementite is 0.90 to 15.00%, and an average value of a width W of the pro-eutectoid cementite defined by Formula (3) is 0.95 μm or less:

$$W = \frac{1}{2} \times (P/2 - ((P/2)^2 - 4A)^{1/2}) \quad (3)$$

where, A in Formula (3) is an area (μm$^2$) of the pro-eutectoid cementite, and P is a circumference length (μm) of the pro-eutectoid cementite.

A railway wheel according to the present disclosure includes:
a rim part,
a hub part, and
a web part which is disposed between the rim part and the hub part and is linked to the rim part and the hub part, wherein
a chemical composition of the railway wheel consists of,
in mass %,
C: 0.80 to 1.60%,
Si: 1.00% or less,
Mn: 0.10 to 1.25%,
P: 0.050% or less,
S: 0.030% or less,
Al: 0.010 to 0.650%,
N: 0.0030 to 0.0200%,
Cr: 0 to 0.60%, and
V: 0 to 0.12%, with
the balance being Fe and impurities, and wherein
in a microstructure of the web part of the railway wheel,
an area fraction of pearlite is 85.0% or more, an area fraction of pro-eutectoid cementite is 0.90 to 15.00%, and a maximum width of the pro-eutectoid cementite is 1.80 μm or less.

Advantageous Effects of Invention

The railway wheel according to the present disclosure exhibits excellent toughness even if the C content is as high as 0.80% or more.

DESCRIPTION OF EMBODIMENTS

[Configuration of Railway Wheel]

Figure 1:
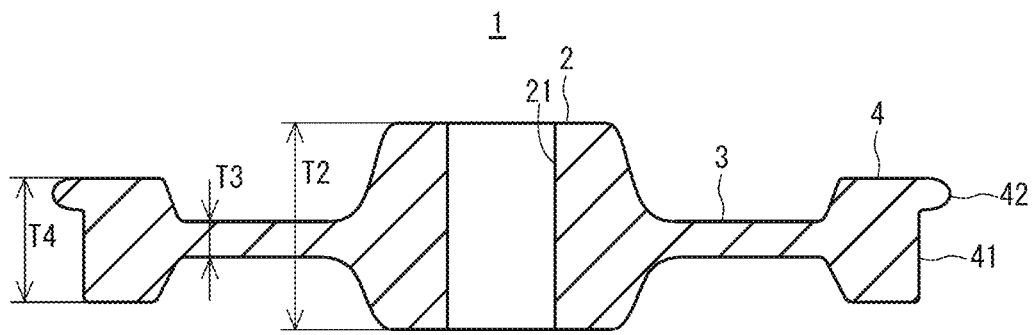
FIG. 1 is a cross sectional view in parallel to a center axis of a railway wheel.

FIG. 1 is a cross sectional view including a center axis of a railway wheel according to the present embodiment. Referring to FIG. 1, a railway wheel 1 has a disc shape and includes a hub part 2, a web part 3, and a rim part 4. The hub part 2 has a cylindrical shape and is disposed in a middle part of the railway wheel 1 in a radial direction (direction normal to the center axis) of the railway wheel 1. The hub part 2 has a through hole 21. A center axis of the through hole 21 corresponds to the center axis of the railway wheel 1. A railway axle shaft not shown is inserted into the through hole 21. A thickness T2 of the hub part 2 is larger than a thickness T3 of the web part 3. The rim part 4 is formed in an edge part in the outer circumference of the railway wheel 1. The rim part 4 includes a tread 41 and a flange part 42. The tread 41 is linked with the flange part 42. The tread 41 and the flange part 42 are in contact with a rail surface while the railway wheel 1 is used. A thickness T4 of the rim part 4 is larger than the thickness T3 of the web part 3. The web part 3 is disposed between the hub part 2 and the rim part 4 and is linked with the hub part 2 and the rim part 4. Specifically, an inner circumferential edge part of the web part 3 is linked with the hub part 2, and an outer circumference edge part of the web part 3 is linked with the rim part 4. The thickness T3 of the web part 3 is smaller than the thickness T2 of the hub part 2 and the thickness T4 of the rim part 4. The diameter of the railway wheel 1 is, though not particularly limited, for example, 700 mm to 1000 mm.

[Technical Concept of Railway Wheel of Present Disclosure]

First, the present inventors have studied on the chemical composition appropriate for improving wear resistance in a railway wheel. As a result, it was found that in a railway wheel, wear resistance when used as a railway wheel is improved more when hardness is increased by increasing the C content to be 0.80% or more, than when hardness is increased by increasing the V content even when the same hardness is obtained. Though this mechanism is not clear, the following matters are considered. The tread of the railway wheel being used is subjected to external force (load) from the rail. By this external force, the cementite in the pearlite in the outer layer immediately below the tread is crushed, and the hardness is further increased by particle dispersion strengthening. Further, carbon in crushed fine cementite dissolves supersaturatedly into ferrite in the pearlite, thereby increasing the hardness of the outer layer immediately below the tread by solid-solution strengthening.

When the C content in steel is increased, the volume fraction of cementite in pearlite will increase, and further pearlite is likely to form finer lamellas. In this case, the wear resistance will be improved by the above described mechanism. In contrast to this, when V is contained in steel, the hardness of steel is increased by precipitation hardening of V carbonitride. In this occasion, since V carbonitride is formed in ferrite, it increases mostly the hardness of ferrite. In other words, when V is contained, although it increases the hardness of ferrite, it does not significantly affect refinement of pearlite. For that reason, although wear resistance can be improved to some extent by containing V, wear resistance cannot be improved as much as by particle dispersion strengthening by crushed cementite and solid-solution strengthening of C.

Then, the present inventors contemplated that to improve wear resistance, it is preferable to use a hyper-eutectoid steel having a C content of 0.80 to 1.60% in the chemical composition of railway wheel.

However, as a result of the study by the present inventors, it was found that in a railway wheel of hyper-eutectoid steel having a C content of 0.80% or more, pro-eutectoid cementite is likely to be formed. The pro-eutectoid cementite deteriorates the toughness of the railway wheel.

Then, the present inventors studied on a method for improving toughness in a railway wheel made of hyper-eutectoid steel having a high C content.

First, the present inventors have studied on enhancing the toughness of a railway wheel by suppressing the formation of pro-eutectoid cementite in a railway wheel made of hyper-eutectoid steel. However, in the case of a railway wheel made of hyper-eutectoid steel with a high C content, it has been found to be very difficult to completely suppress the formation of pro-eutectoid cementite. Then, in order to suppress the formation of pro-eutectoid cementite as much as possible, it has been found to be necessary to strictly control the production process.

Accordingly, the present inventors have considered that the toughness of a railway wheel made of hyper-eutectoid steel cannot be increased by suppressing the formation of pro-eutectoid cementite, but the toughness of a railway wheel made of hyper-eutectoid steel can be increased by controlling the morphology of the pro-eutectoid cementite on the premise that pro-eutectoid cementite is formed. Accordingly, the present inventors further studied on the relation between the morphology of pro-eutectoid cementite formed in a railway wheel made of hyper-eutectoid steel and the toughness of the railway wheel. As a result, it was found for the first time that even when 0.90 to 15.00% in area fraction of pro-eutectoid cementite is formed in the web part of the railway wheel made of hyper-eutectoid steel, sufficient toughness can be obtained when an average value of a width W of the pro-eutectoid cementite defined by Formula (3) is 0.95 μm or less. This point will be described below.

[Relation Between Pro-Eutectoid Cementite and Toughness in Railway Wheel]

Steel materials TP1 and TP2 each having a chemical composition shown in Table 1, which each simulate a railway wheel of hyper-eutectoid steel, are produced.

TABLE 1

| Steel | Chemical Composition (unit is mass %, the balance is Fe and impurities) | | | | | | |
|---|---|---|---|---|---|---|---|
| Material | C | Si | Mn | P | S | Al | N | Cr |
| TP1 | 0.90 | 0.30 | 0.80 | ≤0.050 | ≤0.030 | 0.030 | 0.0040 | 0.10 |
| TP2 | 1.00 | 0.30 | 0.80 | ≤0.050 | ≤0.030 | 0.030 | 0.0040 | 0.10 |

The steel material had a shape of a round bar having a diameter of 20 mm and a length of 125 mm. Of each steel material, heat treatments of heat patterns shown in FIGS. 2 and 3 were performed to vary the morphology of pro-eutectoid cementite to be formed in the steel materials TP1 and TP2.

Figure 2:
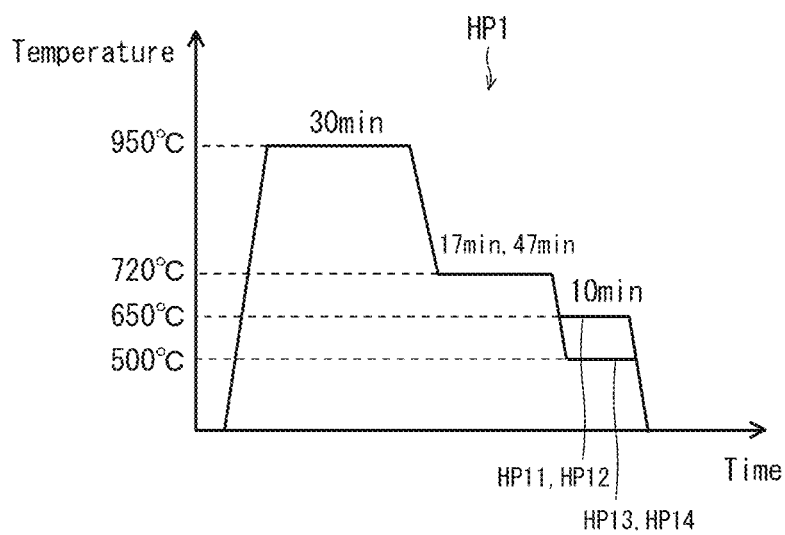
FIG. 2 is a diagram to show a heat pattern in a heat treatment simulating tread quenching.
Figure 3:
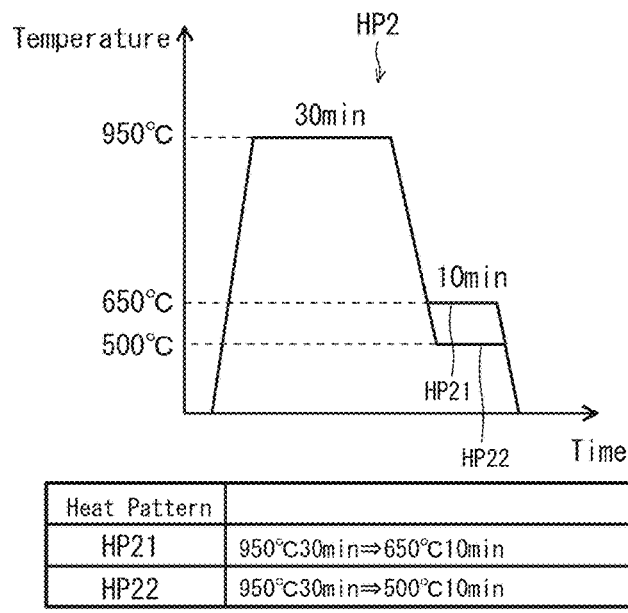
FIG. 3 is a diagram to show a heat pattern in a heat treatment simulating tread quenching, which is different from that of FIG. 2.

The heat patterns shown in FIGS. 2 and 3 each indicate the temperature of the atmosphere of heat treatment. In other words, it shows the temperature of the atmosphere in which the steel material is disposed during the heat treatment. The heat pattern HP1 of FIG. 2 is a heat pattern in which a residence time of the steel materials TP1 and TP2 in a formation temperature range (720° C.) of pro-eutectoid cementite is increased in the steel materials TP1 and TP2. On the other hand, the heat pattern HP2 of FIG. 3 is a heat pattern in which a residence time of the steel material TP2 (1.00% C material) in a formation temperature range of pro-eutectoid cementite is decreased by rapid cooling, or a heat pattern which does not pass through the formation temperature range of pro-eutectoid cementite in the case of the steel material TP1 (0.90% C material) which has a lower C content.

Figure 4:
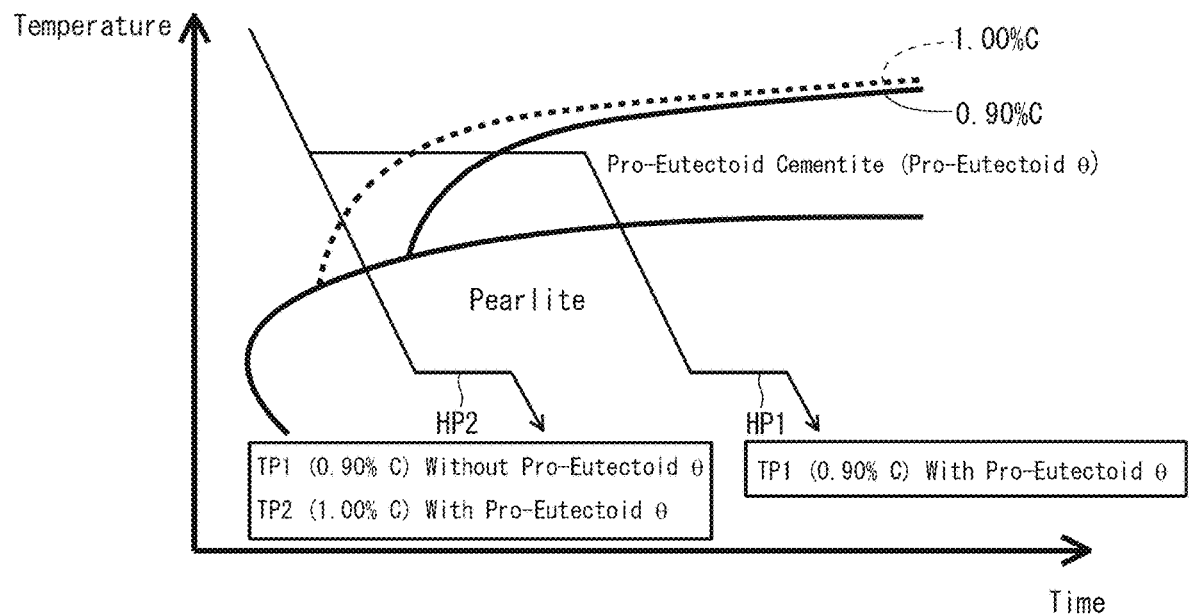
FIG. 4 is a conceptual diagram to show a relation between a time-temperature-transformation diagram and the heat patterns of FIGS. 2 and 3 in steel materials having chemical compositions shown in Table 1.

FIG. 4 is a conceptual diagram to show a relation between the isothermal transformation diagrams of the steel materials TP1 and TP2, and heat patterns HP1, HP2 of FIGS. 2 and 3. FIG. 4 shows a pro-eutectoid cementite nose and a pearlite nose in the chemical composition of each of the steel materials TP1 and TP2. Note that the position of the pearlite nose is substantially the same between the steel material TP1 (0.90% C material) and the steel material TP2 (1.00% C material). On the other hand, regarding the pro-eutectoid cementite nose, that of the steel material TP2 (1.00% C material, a broken line in FIG. 4) is displaced leftward with respect to that of the steel material TP1 (0.90% C material, a solid line in FIG. 4).

With reference to FIG. 4, if the heat pattern HP1 is applied to the steel material TP1 (0.90% C material), the time within the temperature range where the pro-eutectoid cementite precipitates increase. For that reason, pro-eutectoid cementite (also referred to as pro-eutectoid θ) is formed in the microstructure of the steel material TP1 to which the heat pattern HP1 is applied. Further, when the heat pattern HP2 is applied to the steel material TP1 (0.90% C material), the pro-eutectoid cementite formation temperature range will not be passed through. For that reason, substantially no pro-eutectoid cementite is formed in the microstructure of the steel material TP1 to which the heat pattern HP2 is applied. On the other hand, when the heat pattern HP2 is applied to the steel material TP2 (1.00% C material) which has a higher C content than that of the steel material TP1, the heat pattern passes through the pro-eutectoid cementite formation temperature range. For that reason, in the microstructure of the steel material TP2 to which the heat pattern HP2 is applied, pro-eutectoid cementite is formed.

Note that, as described above, in the tread quenching of a railway wheel, the cooling liquid is injected onto a tread 41 shown in FIG. 1 to cool the railway wheel 1 while performing quenching. As shown in FIG. 1, in the railway wheel 1, the thickness T2 of the hub part 2 is larger than the thickness T3 of the web part 3, and the hub part 2 is far from the rim part 4 with which the cooling liquid comes into contact. For that reason, in tread quenching, the cooling rate of the hub part 2 is smaller than the cooling rate of the web part 3. Accordingly, as shown in FIG. 2, in the heat pattern HP1, heat patterns HP11 and HP12 which assumed a cooling rate at the hub part 2, and heat patterns HP13 and HP14 which assumed a cooling rate at the web part 3 were prepared. Similarly, as shown in FIG. 3, in the heat pattern HP2, a heat pattern HP21 which assumed a cooling rate at the hub part 2, and a heat pattern HP22 which assumed a cooling rate at the web part 3 were prepared.

Note that in FIG. 2, the heat patterns HP11 and HP12, which assumed a cooling rate at the hub part, had different holding times at 720° C. Specifically, in the heat pattern HP11, the holding time at 720° C. was 47 minutes, and in the heat pattern HP12, the holding time at 720° C. was 17 minutes. In other words, it was assumed that the amount of pro-eutectoid cementite formed in the steel material heat-treated with the heat pattern HP11 was larger than the amount of pro-eutectoid cementite formed in the steel material heat-treated with the heat pattern HP12. Similarly, in FIG. 2, the heat patterns HP13 and HP14, which assumed the cooling rate at the web part 3, had different holding times at 720° C. Specifically, in the heat pattern HP13, the holding time at 720° C. was 47 minutes, and in the heat pattern HP14, the holding time at 720° C. was 17 minutes. In other words, it was assumed that the amount of pro-eutectoid cementite formed in the steel material heat-treated with the heat pattern HP13 is larger than the amount of pro-eutectoid cementite formed in the steel material heat-treated with the heat pattern HP14.

A plurality of steel materials TP1 were prepared, and a plurality of steel materials TP2 were prepared. Each steel material was heat-treated according to the heat patterns HP11 to HP14, HP21 and HP22, which simulated tread quenching.

Specifically, the test materials of Test Numbers 1 to 8 shown in Table 2 were prepared by combining the steel materials TP1 and TP2, and the heat patterns HP11 to HP14, HP21 and HP22.

TABLE 2

| Test Number | Steel Material | Heat Pattern | Heat Treatment Contents | Remarks |
|---|---|---|---|---|
| 1 | TP1 | HP11 | 950° C. for 30 min → 720° C. for 47 min → 650° C. for 10 min | Low C Material Hub Part Slow Cooling |
| 2 | TP1 | HP12 | 950° C. for 30 min → 720° C. for 17 min → 650° C. for 10 min | Low C Material Hub Part Cooling |
| 3 | TP1 | HP21 | 950° C. for 30 min → 650° C. for 10 min | Low C Material Hub Part Accelerated Cooling |
| 4 | TP1 | HP13 | 950° C. for 30 min → 720° C. for 47 min → 500° C. for 10 min | Low C Material Web Part Slow Cooling |

TABLE 2-continued

| Test Number | Steel Material | Heat Pattern | Heat Treatment Contents | Remarks |
|---|---|---|---|---|
| 5 | TP1 | HP14 | 950° C. for 30 min → 720° C. for 17 min → 500° C. for 10 min | Low C Material Web Part Cooling |
| 6 | TP1 | HP22 | 950° C. for 30 min → 500° C. for 10 min | Low C Material Web Part Accelerated Cooling |
| 7 | TP2 | HP21 | 950° C. for 30 min → 650° C. for 10 min | High C Material Hub Part Accelerated Cooling |
| 8 | TP2 | HP22 | 950° C. for 30 min → 500° C. for 10 min | High C Material Web Part Accelerated Cooling |

Figure 5:
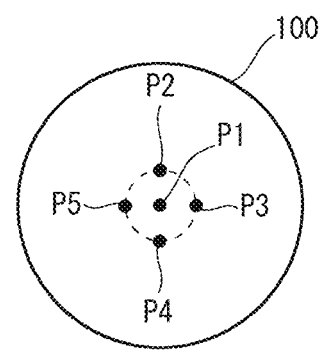
FIG. 5 is a schematic diagram to explain measurement positions for the Vickers hardness test.

The Vickers hardness of the steel material of each Test Number 1 to 8 after heat treatment was determined. Specifically, as shown in FIG. 5, in a cross section perpendicular to the longitudinal direction of a steel material 100 of each test number, Vickers hardness (HV) was measured conforming to JIS Z 2244 (2009) at 5 points including a center point P1 of the steel material 100, and points P2 to P5 which were located at a 90° pitch on a circle having a radius of 1 mm and centered on the point P1. The test force at this time was 9.8 N (1.0 kgf). The average value of the obtained Vickers hardness was defined as the Vickers hardness (HV) of that test number.

Further, in order to evaluate the toughness of the steel material of each of Test Numbers 1 to 8 after heat treatment, the Charpy impact value was determined. Specifically, a U-notch test specimen conforming to JIS Z 2242 (2005) was collected from the center in a cross section perpendicular to the longitudinal direction of the steel material of each test number. The cross section perpendicular to the longitudinal direction of the U-notch test specimen was a square of 10 mm×10 mm, and the length of the U-notch test specimen in the longitudinal direction was 55 mm. The longitudinal direction of the U-notch test specimen was parallel to the longitudinal direction of the steel material. The U notch was formed at a longitudinal center of the test specimen (that is, the middle position of a length of 55 mm). The notch depth was 2 mm and the notch bottom radius was 1 mm. The Charpy impact test was conducted conforming to JIS Z 2242 (2005) in the atmosphere at a room temperature. Charpy impact values (J/cm$^2$) were determined for four U-notch test specimens in each test number, and an average value thereof was defined as the Charpy impact value (J/cm$^2$) of that test number.

Furthermore, the microstructure of the steel material of each test number after heat treatment was observed to investigate the presence or absence of pro-eutectoid cementite. Specifically, a sample for microstructure observation was taken from the central position of the cross section perpendicular to the longitudinal direction of the steel material of each test number after heat treatment. Of the surfaces of the sample, the cross section perpendicular to the longitudinal direction of the steel material was used as the observation surface. The observation surface of each sample was mirror-finished by mechanical polishing. Then, the observation surface was etched with a sodium picric acid solution (100 ml of water+2 g of picric acid+25 g of sodium hydroxide), which was an etching solution suitable for revealing pro-eutectoid cementite. In the etching, the sample was immersed in a boiled sodium picric acid solution. A photographic image was obtained using an optical microscope with a magnification of 500 times for any one visual field (200 μm×200 μm) in the observation surface of the sample after etching. On the observation surface, the pro-eutectoid cementite formed at the prior-austenite grain boundaries appears in black. Therefore, the presence or absence of pro-eutectoid cementite could be confirmed.

Figure 6:
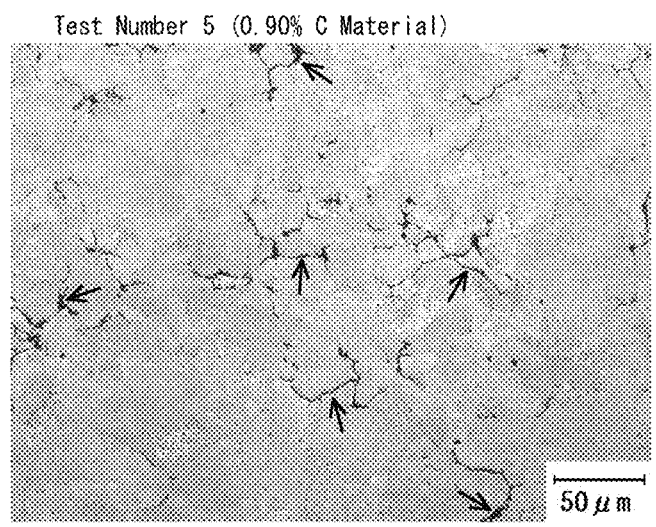
FIG. 6 is a microstructure photographic image of Test Number 5 (0.90% C material) obtained by microstructure observation.
Figure 7:
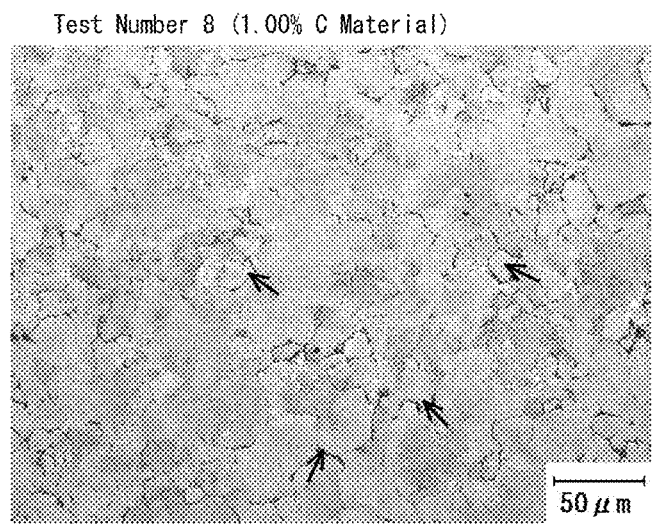
FIG. 7 is a microstructure photographic image of Test Number 8 (1.00% C material) obtained by microstructure observation.

FIG. 6 is a microstructure photographic image of Test Number 5 (0.90% C material) obtained by the above described microstructure observation. FIG. 7 is a microstructure photographic image of Test Number 8 (1.00% C material) obtained by the above described microstructure observation. With reference to FIGS. 6 and 7, black regions (regions indicated by a black arrow) in those photographic images are pro-eutectoid cementite.

The area fraction of the pro-eutectoid cementite confirmed in the above described visual field was determined. Specifically, the area of pro-eutectoid cementite in the visual field (200 μm×200 μm) was determined. The ratio of the area of the obtained pro-eutectoid cementite to the total area of the visual field was defined as the pro-eutectoid cementite area fraction (%).

If the obtained pro-eutectoid cementite area fraction was less than 0.90%, it was judged that there was no pro-eutectoid cementite. On the other hand, if the pro-eutectoid cementite area fraction was more than 0.90%, it was judged that there was pro-eutectoid cementite.

Based on the above described test results, relation among the Vickers hardness (HV), the Charpy impact value (J/cm$^2$), and the presence or absence of pro-eutectoid cementite at each test number were investigated.

Figure 8:
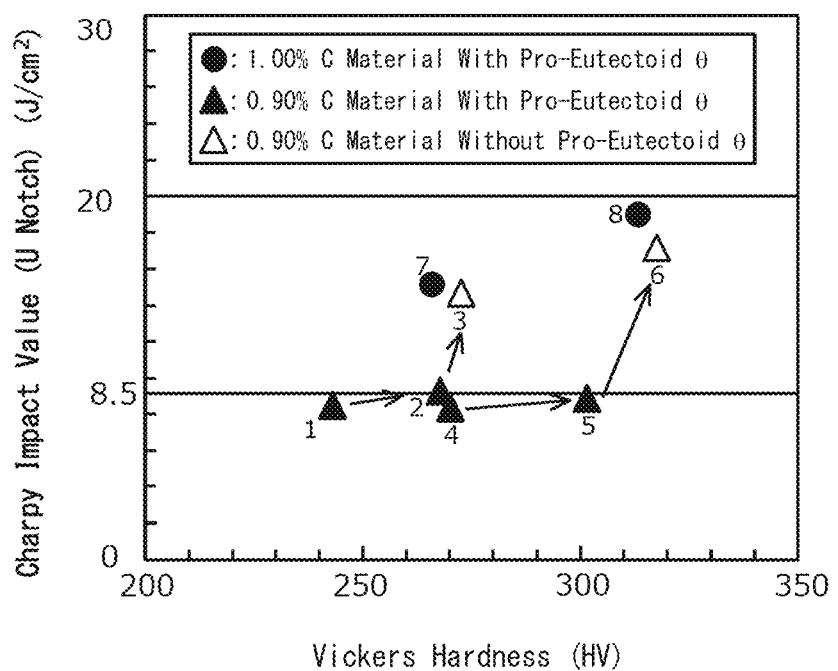
FIG. 8 is a diagram to show relation among Vickers hardness (HV), Charpy impact value (J/cm$^2$), and the presence or absence of pro-eutectoid cementite in hyper-eutectoid steel materials (0.90% C material and 1.00% C material).

FIG. 8 is a diagram to show relation among the Vickers hardness (HV), the Charpy impact value (J/cm$^2$), and the presence or absence of pro-eutectoid cementite in hyper-eutectoid steel materials (0.90% C material and 1.00% C material). Referring to FIG. 8, in Test Numbers 1, 2, 4, and 5 to which the heat pattern HP1 was applied by using the steel material TP1 (0.90% C material), there was pro-eutectoid cementite in the microstructure. For that reason, the Charpy impact value was 8.5 J/cm$^2$ or less. Note that comparing Test Number 1 (heat pattern HP11) with Test Number 2 (heat pattern TP12), Test Number 2, which had a shorter holding time at 720° C., had higher Vickers hardness than that of Test Number 1. However, the Charpy impact values were equal between Test Numbers 1 and 2. Similarly, when comparing Test Number 4 (heat pattern TP13) with Test Number 5 (heat pattern HP14), Test number 5, which had a shorter holding time at 720° C., had higher Vickers hardness than that of Test Number 4. However, the Charpy impact values were equal between Test Numbers 4 and 5. On the other hand, in Test Numbers 3 and 6 in which the steel material TP1 was used and to which the heat pattern HP2 (HP21 and HP22) was applied, pro-eutectoid cementite was not present in the microstructure. Therefore, the Charpy impact value was as high as 14 J/cm$^2$ or more.

On the other hand, in Test Numbers 7 and 8, which used the steel material TP2 (1.00% C material) and to which the heat pattern HP2 (HP21 and HP22) was applied, pro-eutectoid cementite was present in the microstructure as in Test Numbers 1, 2, 4, and 5. However, despite the presence of pro-eutectoid cementite, the Charpy impact values of Test Numbers 7 and 8 were significantly higher than those of Test Numbers 1, 2, 4, and 5, in which pro-eutectoid cementite was present as well, and were more than 14 J/cm$^2$. In particular, comparing Test Number 2 with Test Number 7, the Charpy impact values were significantly different even though the Vickers hardness was almost the same between them. Similarly, comparing Test No. 5 with Test No. 8, the Charpy impact values were significantly different even though the Vickers hardness was almost the same between them.

The investigation results described above indicate that there is possibility to improve toughness even if pro-eutectoid cementite is present. Accordingly, the present inventors focused on the steel materials of Test Numbers 5 and 8 in which pro-eutectoid cementite was present, and prepared a microstructure photographic image using a scanning electron microscope (SEM) with a magnification of 5000 times to investigate the morphology of pro-eutectoid cementite in the microstructure of Test Numbers 5 and 8.

Figure 9:
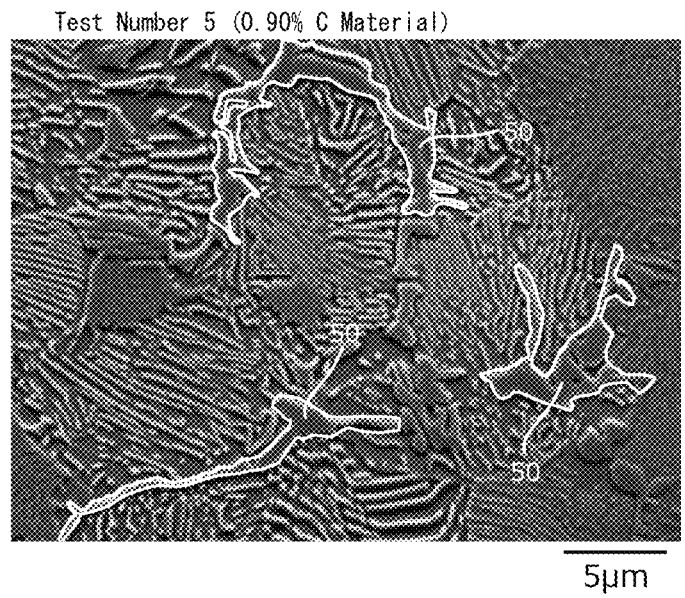
FIG. 9 is a microstructure photographic image of Test Number 5 (0.90% C material) in Table 2 obtained by the SEM.
Figure 10:
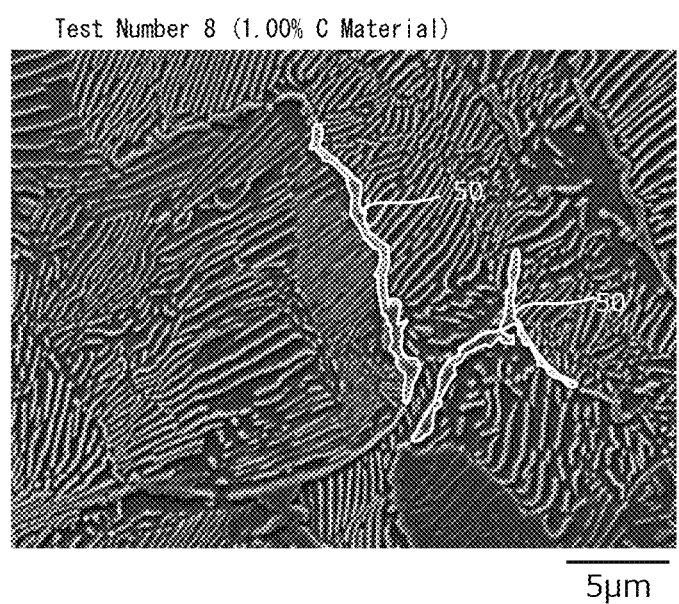
FIG. 10 is a microstructure photographic image of Test Number 8 (1.00% C material) in Table 2 obtained by the SEM.

FIG. 9 is a microstructure photographic image of Test Number 5 obtained by the SEM. FIG. 10 is a microstructure photographic image of Test Number 8 obtained by the SEM. A region surrounded by a white line in FIGS. 9 and 10 is pro-eutectoid cementite (reference sign 50). Comparing FIGS. 9 and 10, the morphology of pro-eutectoid cementite formed in Test Number 8 which exhibited a high Charpy impact value was remarkably different from the morphology of pro-eutectoid cementite formed in Test Number 5 which exhibited a low Charpy impact value. Specifically, the pro-eutectoid cementite of Test Number 8 was formed to have a narrower width of pro-eutectoid cementite as a whole as compared with the pro-eutectoid cementite of Test Number 5.

From the study results described above, the present inventors have considered that it is possible to suppress deterioration of toughness even if pro-eutectoid cementite is formed in the web part 3 of the railway wheel 1, when formed pro-eutectoid cementite has a narrow width.

Accordingly, the present inventors paid attention to the width of pro-eutectoid cementite in the microstructure photographic image as an index showing the morphology of pro-eutectoid cementite in the railway wheel 1. Then, the present inventors defined the following two indexes with respect to the width of pro-eutectoid cementite.

(A) Specification using an average value of the width of pro-eutectoid cementite as an index (B) Specification using the maximum width of pro-eutectoid cementite as an index The average value of the width of pro-eutectoid cementite of (A) described above can be obtained based on the rectangular approximation method (ribbon-like method) described in Non-Patent Literature 1. The maximum width of pro-eutectoid cementite of (B) described above can be obtained by performing a thinning process, which is a type of image processing method. Hereinafter, the above described (A) and (B) will be described in detail.

(A) Specification Using an Average Value of a Width W of Pro-Eutectoid Cementite as an Index of the Morphology of Pro-Eutectoid Cementite An average value of the width W of pro-eutectoid cementite is obtained by the rectangular approximation method described in Non-Patent Literature 1. Specifically, it is obtained by the following method. The above described microstructure photographic image (200 μm×200 μm) obtained by the above described optical microscope with a magnification of 500 times is binarized by image processing to identify pro-eutectoid cementite. An area A of the identified pro-eutectoid cementite is determined. Further, the length of outer circumference P (outer circumference length) of the identified pro-eutectoid cementite is determined. Using the area A and the outer circumference length P of each of the obtained pro-eutectoid cementite, it is assumed that the pro-eutectoid cementite is a rectangle having the area A and the outer circumference length P. Then, when cementite is assumed to be a rectangle, the longer side of the rectangle is regarded as the length L of the pro-eutectoid cementite, and the shorter side of the rectangle is regarded as the width W of the pro-eutectoid cementite. In other words, the pro-eutectoid cementite is regarded as a rectangle satisfying the following Formulae (a) and (b).

$$A = L \times W \quad (a)$$

$$P = 2 \times (L + W) \quad (b)$$

In this way, when each pro-eutectoid cementite is approximated to a rectangle, the width W of the pro-eutectoid cementite can be defined by the following Formula (3) based on Formulae (a) and (b).

$$W = \tfrac{1}{2} \times (P/2 - ((P/2)^2 - 4A)^{1/2}) \quad (3)$$

Note that the length L of pro-eutectoid cementite can be defined by the following Formula.

$$L = \tfrac{1}{2} \times (P/2 + ((P/2)^2 - 4A)^{1/2})$$

By using Formula (3), the width W of each pro-eutectoid cementite can be obtained from the area A and the outer circumference length P of each pro-eutectoid cementite identified in the observation visual field. Then, the average value of the width W of pro-eutectoid cementite can be obtained by using the width W of each pro-eutectoid cementite.

In the microstructure observation visual field (200 μm×200 μm) of Test Numbers 1, 2, 4, 5, 7, and 8 in which pro-eutectoid cementite was confirmed, the area A and the outer circumference length P were determined by the above described method for each pro-eutectoid cementite identified in the observation visual field. An average value of the area A of the identified pro-eutectoid cementite was determined, and an average value of the outer circumference length P was determined. By using the determined average value of the area A and the determined average value of the outer circumference length P, the width W of the pro-eutectoid cementite defined by Formula (3) was determined. The determined width W of the pro-eutectoid cementite was defined as the average value (μm) of the width W of the pro-eutectoid cementite in that test number. Then, the relation between the determined average value of the width W of the pro-eutectoid cementite and the Charpy impact value was determined.

Figure 11:
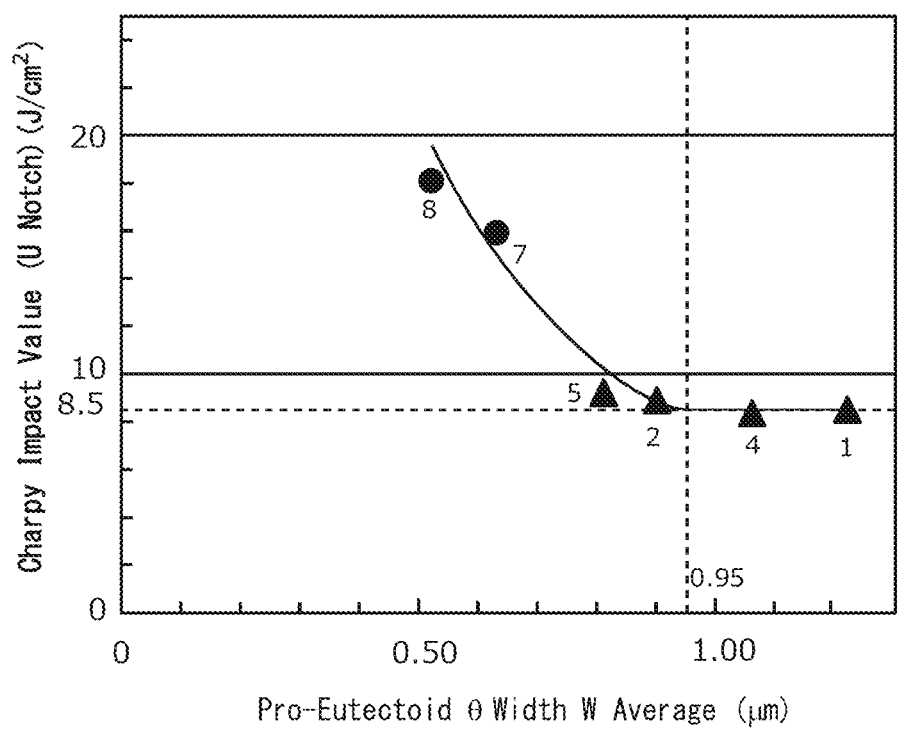
FIG. 11 is a diagram to show a relation between pro-eutectoid cementite widths and Charpy impact values for Test Numbers 1, 2, 4, 5, 7, and 8 in Table 2.

FIG. 11 is a diagram to show a relation between the average value of the width W of the pro-eutectoid cementite and the Charpy impact value for Test Numbers 1, 2, 4, 5, 7, and 8. Referring to FIG. 11, when an average value of the width W of pro-eutectoid cementite defined by the above described Formula (3) is more than 0.95 μm (Test Numbers 1 and 4), the Charpy impact value will be 8.5 J/cm$^2$ or less. In contrast to this, if the pro-eutectoid cementite becomes 9.5 μm or less (Test Numbers 2, 5, 7, and 8), the Charpy impact value will be more than 8.5 J/cm$^2$, and moreover, the Charpy impact value will rapidly increase as the average value of the width W of the pro-eutectoid cementite decreases. In other words, in the graph of FIG. 11, there is an inflection point in the vicinity of the average value of the width W of the pro-eutectoid cementite, which equals to 0.95 μm.

From the study results described above, the present inventors have found that in the railway wheel made of hyper-eutectoid steel, by controlling the morphology of pro-eutectoid cementite, specifically by controlling the average value of the width W of the pro-eutectoid cementite defined by Formula (3) to be 0.95 μm or less, the Charpy impact value becomes more than 8.5 J/cm² despite the presence of pro-eutectoid cementite, and thus excellent toughness can be obtained.

(B) Specification Using the Maximum Width of Pro-Eutectoid Cementite as an Index of the Morphology of Pro-Eutectoid Cementite The maximum width of pro-eutectoid cementite was determined by the following method. The above described observation surface was mirror-finished by mechanical polishing and then etched with a nital solution. In any eight visual fields in the observation surface after etching, observation is performed at a magnification of 2000 times by using a scanning electron microscope (SEM) to obtain a microstructure photographic image (60 μm×45 μm) which is a secondary electron image. The microstructure photographic image is binarized by image processing to identify pro-eutectoid cementite. The identified pro-eutectoid cementite is subjected to a thinning process.

Figure 12:
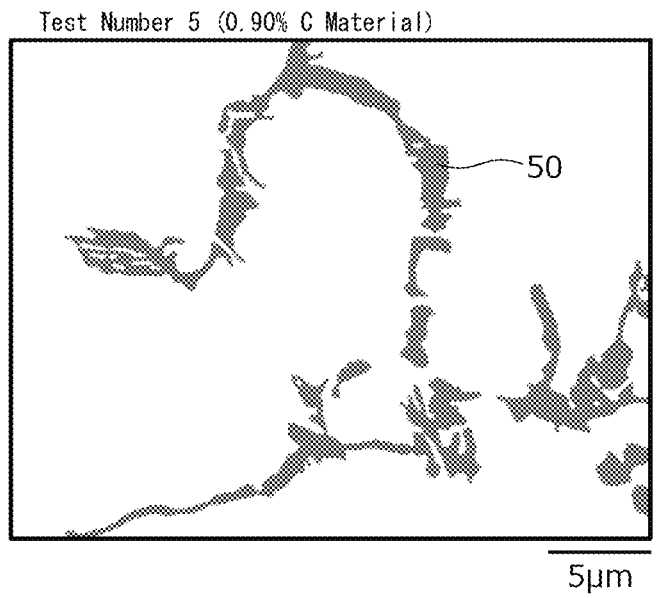
FIG. 12 is a diagram to show pro-eutectoid cementite identified by subjecting the microstructure photographic image shown in FIG. 9 to a binarization process.

FIG. 12 is a diagram to show pro-eutectoid cementite identified by subjecting the microstructure photographic image shown in FIG. 9 to a binarization process. As shown in FIG. 12, pro-eutectoid cementite 50 can be easily identified by performing a well-known binarization process. In FIG. 12, in the microstructure, the pro-eutectoid cementite 50 is shown in black, and the region (pearlite region) other than the pro-eutectoid cementite is shown in white.

After identifying the pro-eutectoid cementite 50 in the microstructure photographic image by the binarization process, the identified pro-eutectoid cementite 50 is subjected to a thinning process. The thinning process is a process of converting a binarized image (pro-eutectoid cementite 50) into a line image having a width of 1 pixel, and is a well-known image processing method. Hereinafter, the line image obtained by the thinning process is referred to as a "skeleton line".

Figure 13:
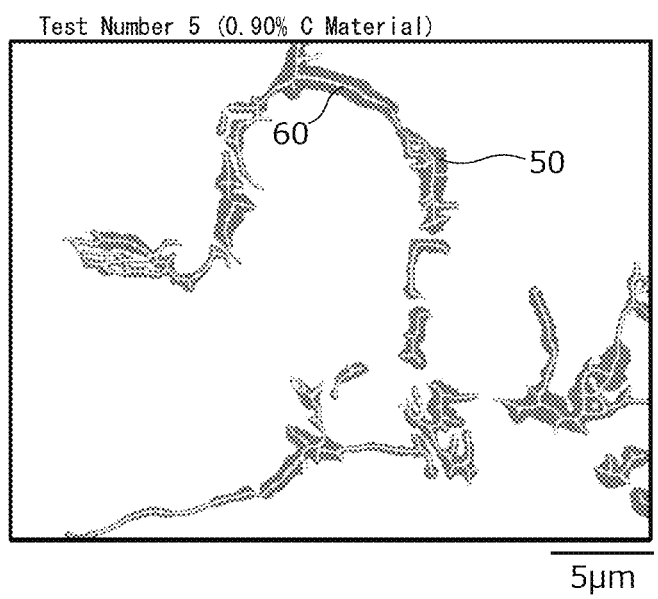
FIG. 13 is a diagram to show a skeleton line, which is obtained by subjecting the pro-eutectoid cementite of FIG. 12 to a thinning process, superposed with the pro-eutectoid cementite.

The pro-eutectoid cementite 50 in the binarized image was subjected to the thinning process to obtain a skeleton line. FIG. 13 is a diagram to show a skeleton line 60, which is obtained by subjecting the pro-eutectoid cementite 50 of FIG. 12 to the thinning process, superposed with the pro-eutectoid cementite 50.

Figures 14, 15:
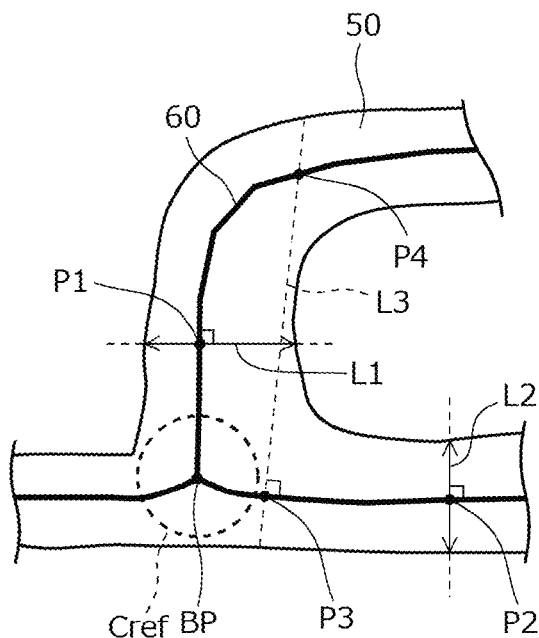
FIG. 14 is a schematic diagram to partially enlarge binarized pro-eutectoid cementite and a skeleton line 60 of the pro-eutectoid cementite.
FIG. 15 is a diagram to show an optical microscope photographic image and an image after the binarization process.

FIG. 14 is a partially enlarged schematic diagram of binarized pro-eutectoid cementite 50 and a skeleton line 60 of the pro-eutectoid cementite 50. Referring to FIG. 14, a straight line is drawn perpendicular to the skeleton line 60 at any measurement point P on the skeleton line 60. Then, in the straight line, a line segment L between two intersection points with the contour of the pro-eutectoid cementite 50 is defined as the width of the pro-eutectoid cementite at the measurement point P. Referring to FIG. 14, for example, at a measurement point P1 on the skeleton line 60, a straight line perpendicular to the skeleton line 60 is drawn, and on the straight line, a length of a line segment L1 between two intersection points with the contour of the pro-eutectoid cementite 50 is defined as the width of the pro-eutectoid cementite 50 at the measurement point P1. Similarly, on the skeleton line 60, a length of a line segment L2 perpendicular to the skeleton line 60 at a measurement point P2 is defined as the width of the pro-eutectoid cementite 50 at the measurement point P2.

Note that in the skeleton line 60, a branch point BP at which the skeleton line 60 branches may occur. The skeleton line 60 in a reference circle Cref having a diameter of 1.5 μm and centered on the branch point BP is excluded from the measurement of the width of pro-eutectoid cementite. Further, when the line segment L of the measurement point P outside the reference circle Cref intersects with the skeleton line 60 twice or more, the length of the line segment L is also excluded from the measurement of the width of the pro-eutectoid cementite 50. In FIG. 14, a line segment L3 of a measurement point P3 outside the reference circle Cref intersects with a point P4 on the skeleton line 60 in addition to the measurement point P3. In other words, the line segment L3 intersects with the skeleton line 60 twice or more. In this case, the line segment L3 is excluded from the measurement of the width of the pro-eutectoid cementite 50.

Among the widths of pro-eutectoid cementite measured in each visual field (8 visual fields in total), the maximum width is defined as a maximum width (μm) of pro-eutectoid cementite.

The present inventors measured the maximum width of pro-eutectoid cementite by the above described method. As a result, the present inventors have found that when the maximum width of pro-eutectoid cementite is 1.80 μm or less, the Charpy impact value becomes more than 8.5 J/cm², and thus excellent toughness can be achieved.

The railway wheel of the present embodiment, which has been completed based on the above described findings, has the following configuration.

A railway wheel of [1] includes:
a rim part,
a hub part, and
a web part which is disposed between the rim part and the hub part and is linked to the rim part and the hub part, wherein
a chemical composition of the railway wheel consists of, in mass %,
C: 0.80 to 1.60%,
Si: 1.00% or less,
Mn: 0.10 to 1.25%,
P: 0.050% or less,
S: 0.030% or less,
Al: 0.010 to 0.650%,
N: 0.0030 to 0.0200%,
Cr: 0 to 0.60%, and
V: 0 to 0.12%, with the balance being Fe and impurities, and wherein
in a microstructure of the web part of the railway wheel, an area fraction of pearlite is 85.0% or more, an area fraction of pro-eutectoid cementite is 0.90 to 15.00%, and an average value of a width W of the pro-eutectoid cementite defined by Formula (3) is 0.95 μm or less:

$$W = \frac{1}{2} \times (P/2 - ((P/2)^2 - 4A)^{1/2}) \quad (3)$$

where, in Formula (3), A is an area (μm²) of the pro-eutectoid cementite, and P is a circumference length (μm) of the pro-eutectoid cementite.

A railway wheel of [2] is the railway wheel according to [1], wherein
in a microstructure of the hub part of the railway wheel, an area fraction of pearlite is 85.0% or more, an area fraction of the pro-eutectoid cementite is 0.90 to 15.00%, and an average value of the width W of the pro-eutectoid cementite defined by Formula (3) is 0.95 μm or less.

A railway wheel of [3] includes:
a rim part,
a hub part, and
a web part which is disposed between the rim part and the hub part and is linked to the rim part and the hub part, wherein a chemical composition of the railway wheel consists of, in mass %,
C: 0.80 to 1.60%,
Si: 1.00% or less,
Mn: 0.10 to 1.25%,
P: 0.050% or less,
S: 0.030% or less,
Al: 0.010 to 0.650%,
N: 0.0030 to 0.0200%,
Cr: 0 to 0.60%, and
V: 0 to 0.12%, with the balance being Fe and impurities, and wherein
in a microstructure of the web part of the railway wheel, an area fraction of pearlite is 85.0% or more, an area fraction of pro-eutectoid cementite is 0.90 to 15.00%, and a maximum width of the pro-eutectoid cementite is 1.80 μm or less.

A railway wheel of [4] is the railway wheel according to [3], wherein
in a microstructure of the hub part of the railway wheel, an area fraction of pearlite is 85.0% or more, an area fraction of the pro-eutectoid cementite is 0.90 to 15.00%, and a maximum width of the pro-eutectoid cementite is 1.80 μm or less.

A railway wheel of [5] is the railway wheel according to any one of [1] to [4], wherein
the chemical composition contains one or more elements selected from the group consisting of:
Cr: 0.02 to 0.60%, and
V: 0.02 to 0.12%.

Hereinafter, the railway wheel of the present embodiment will be described in detail. In the present description, the symbol "%" regarding elements means, unless otherwise stated, mass %.

[Chemical Composition of Railway Wheel]

A railway wheel 1 of the present embodiment includes a hub part 2, a web part 3, and a rim part 4, as shown in FIG. 1. The chemical composition of the railway wheel 1 of the present embodiment contains the following elements.

C: 0.80 to 1.60%

Carbon (C) increases the hardness of steel and increases the wear resistance of the railway wheel 1. If the C content is less than 0.80%, this effect cannot be achieved even if the contents of other elements are within a range of the present embodiment. On the other hand, if the C content is more than 1.60%, an excessive amount of pro-eutectoid cementite precipitates at prior-austenite grain boundaries, and the area fraction of pro-eutectoid cementite will be more than 15.00% even if the contents of other elements are within a range of the present embodiment. In this case, the toughness of the railway wheel 1 deteriorates. Therefore, the C content is 0.80 to 1.60%. The lower limit of the C content is preferably 0.85%, more preferably 0.87%, further preferably 0.90%, and further preferably 0.95%. The upper limit of the C content is preferably 1.55%, more preferably 1.45%, further preferably 1.30%, further preferably 1.15%, and further preferably 1.05%.

Si: 1.00% or Less

Silicon (Si) is unavoidably contained. In other words, the Si content is more than 0%. Si solid-solution strengthens ferrite to increase the hardness of steel. However, if the Si content is more than 1.00%, pro-eutectoid cementite becomes likely to be formed even if the contents of other elements are within a range of the present embodiment. If the Si content is more than 1.00%, the hardenability of steel becomes too high, and martensite becomes likely to be formed. In such a case, the thickness of the quenched layer formed on the tread at the time of tread quenching increases. As a result, the amount of cutting increases and the yield decreases. Further, if the Si content is more than 1.00%, quenching of the rim part 4 is caused by friction heat generated between itself and the brake during use of the railway wheel 1. In such a case, crack resistance of steel may deteriorate. Therefore, the Si content is 1.00% or less. The upper limit of the Si content is preferably 0.90%, more preferably 0.80%, further preferably 0.70%, and further preferably 0.50%. The lower limit of the Si content will not be particularly limited. However, excessive decrease of the Si content will increase the production cost. Therefore, the lower limit of the Si content is preferably 0.01%, and more preferably 0.05%. In the viewpoint of increasing the hardness of steel, the lower limit of the Si content is further preferably 0.10%, and further preferably 0.15%.

Mn: 0.10 to 1.25%

Manganese (Mn) solid-solution strengthens ferrite, thereby increasing the hardness of steel. Mn further forms MnS to improve the machinability of steel. If the Mn content is less than 0.10%, these effects cannot be achieved even if the contents of other elements are within a range of the present embodiment. On the other hand, if the Mn content is more than 1.25%, the hardenability of steel becomes too high even if the contents of other elements are within a range of the present embodiment. In such a case, the thickness of the quenched layer increases, and the yield in the production process decreases. Further, the rim part 4 is quenched caused by friction heat generated between the wheel and the brake during use of the railway wheel 1. In this case, crack resistance of steel may deteriorate. Therefore, the Mn content is 0.10 to 1.25%. The lower limit of the Mn content is preferably 0.50%, more preferably 0.60%, and further preferably 0.70%. The upper limit of the Mn content is preferably 1.10%, more preferably 1.00%, further preferably 0.95%, and further preferably 0.90%.

P: 0.050% or Less

Phosphorus (P) is an unavoidably contained impurity. In other words, the P content is more than 0%. P segregates at grain boundaries to deteriorate the toughness of steel. Therefore, the P content is 0.050% or less. The upper limit of the P content is preferably 0.030%, and more preferably 0.020%. The P content is preferably as low as possible. However, excessive decrease of the P content will increase the production cost. Therefore, in consideration of ordinary industrial manufacturing, the lower limit of the P content is preferably 0.001%, and more preferably 0.002%.

S: 0.030% or Less

Sulfur (S) is unavoidably contained. In other words, the S content is more than 0%. S forms MnS and enhances the machinability of steel. On the other hand, if the S content is too high, the toughness of steel deteriorates. Therefore, the S content is 0.030% or less. The upper limit of the S content is preferably 0.020%. Excessive reduction of the S content will increase the production cost. Therefore, the lower limit of the S content is preferably 0.001%, more preferably 0.002%, and further preferably 0.005%.

Al: 0.010 to 0.650%

Aluminum (Al) deoxidizes steel. Further, Al suppresses formation of pro-eutectoid cementite, thereby enhancing the toughness of steel. Further, Al combines with N to form AlN, thereby refining grains. Refining grains will improve the toughness of steel. If the Al content is less than 0.010%, these effects cannot be sufficiently achieved even if the contents of other elements are within a range of the present embodiment. On the other hand, if the Al content is more than 0.650%, the amount of non-metallic inclusions increases, thereby deteriorating the toughness of steel even if the contents of other elements are within a range of the present embodiment. Therefore, the Al content is 0.010 to 0.650%. The lower limit of the Al content is preferably 0.012%, more preferably 0.020%, further preferably 0.025%, and further preferably 0.030%. The upper limit of the Al content is preferably 0.600%, more preferably 0.500%, further preferably 0.300%, further preferably less than 0.250%, and further preferably 0.240%. The Al content as used herein means the content of acid-soluble Al (sol. Al).

N: 0.0030 to 0.0200%

Nitrogen (N) combines with Al to form AlN and refines prior-austenite grains. As prior-austenite grains are refined, the toughness of steel is improved. If the N content is less than 0.0030%, this effect cannot be sufficiently achieved even if the contents of other elements are within a range of the present embodiment. On the other hand, if the N content is more than 0.0200%, such effect will be saturated even if the contents of other elements are within a range of the present embodiment. Therefore, the N content is 0.0030 to 0.0200%. The lower limit of the N content is preferably 0.0035%, and more preferably 0.0040%. The upper limit of the N content is preferably 0.0100%, and more preferably 0.0080%.

The balance of the chemical composition of the railway wheel 1 according to the present embodiment consists of Fe and impurities. Here, an impurity means an element, which is introduced from ores and scraps as the raw material, or from a production environment, etc., when the above described railway wheel 1 is industrially produced, and which is permitted within a range not adversely affecting the railway wheel 1 of the present embodiment. Examples of impurities other than the above described impurities are O, Cu, Ni, and Mo. The contents of these impurity elements are, for example, as follows: O: 0.0070% or less, Cu: 0.20% or less, more preferably 0.10% or less, and further preferably 0.08% or less, Ni: 0.20% or less, more preferably 0.10% or less, and further preferably 0.08% or less, and Mo: 0.07% or less.

[Optional Elements]

The chemical composition of the railway wheel 1 of the present embodiment may contain Cr in place of part of Fe.

Cr: 0 to 0.60%

Chromium (Cr) is an optional element and may not be contained. In other words, the Cr content may be 0%. When contained, Cr decreases the lamellar spacing of pearlite. This significantly increases the hardness of pearlite. However, if the Cr content is more than 0.60%, the hardenability becomes excessively high even if the contents of other elements are within a range of the present embodiment, and the thickness of the quenched layer after tread quenching increases excessively. Therefore, the Cr content is 0 to 0.60%. The lower limit of the Cr content is preferably more than 0%, more preferably 0.01%, further preferably 0.02%, and further preferably 0.03%. The upper limit of the Cr content is preferably 0.55%, more preferably 0.40%, further preferably 0.30%, further preferably 0.25%, and further preferably 0.20%.

The chemical composition of the railway wheel 1 of the present embodiment may further contain V in place of part of Fe.

V: 0 to 0.12%

Vanadium (V) is an optional element and may not be contained. In other words, the V content may be 0%. When contained, V forms any of carbide, nitride and carbonitride, thereby precipitation strengthening steel (specifically, ferrite in steel). As a result, the hardness of the railway wheel 1 is increased, thereby further enhancing wear resistance. However, if the V content is more than 0.12%, the hardenability becomes high, and the thickness of the quenched layer after tread quenching increases excessively. Therefore, the V content is 0 to 0.12%. The lower limit of the V content is preferably more than 0%, more preferably 0.01%, further preferably 0.02%, and further preferably 0.03%. The upper limit of the V content is preferably 0.11%, and more preferably 0.10%.

[Microstructure of Web Part of Railway Wheel]

In the microstructure of the web part 3 of the railway wheel 1 of the present embodiment, the area fraction of pearlite is 85.0% or more, and the area fraction of pro-eutectoid cementite is 0.90 to 15.00%. In the microstructure of the web part 3, the phases other than pearlite or pro-eutectoid cementite are, for example, martensite and/or bainite.

Preferably, in the microstructure of the hub part 2 of the railway wheel of the present embodiment, the area fraction of pearlite is 85.0% or more, and the area fraction of pro-eutectoid cementite is 0.90 to 15.00%. In the microstructure of the hub part 2, the phases other than pearlite or pro-eutectoid cementite are, for example, martensite and/or bainite.

Note that in the microstructure of the rim part 4, the pearlite area fraction is preferably 95.0% or more, and more preferably 97.0% or more. In the microstructure of the rim part 4, the phases other than pearlite or pro-eutectoid cementite are, for example, martensite and/or bainite.

The pearlite area fraction and the pro-eutectoid cementite area fraction in the microstructures of the web part 3, the hub part 2, and the rim part 4 are determined by the following method. Samples are collected from the middle position in the thickness direction of the web part 3 (the middle position of the thickness T3 in FIG. 1), the middle position in the thickness direction of the hub part 2 (the middle position of the thickness T2 in FIG. 1), and the middle position in the thickness direction of the rim part 4 (the middle position of the thickness T4 in FIG. 1). The observation surface of each sample is mirror-finished by mechanical polishing. Then, the observation surface is etched with a sodium picric acid solution (100 ml of water+2 g of picric acid+25 g of sodium hydroxide). In the etching, the sample is immersed in a boiled sodium picric acid solution. A photographic image is produced using an optical microscope with a magnification of 500 times for any one visual field (200 μm×200 μm) in the observation surface of the sample after etching. In the observation surface, pearlite and pro-eutectoid cementite have different contrasts. For example, in FIGS. 6 and 7, a black region indicated by an arrow is pro-eutectoid cementite and the remaining light gray region is pearlite. In this way, each phase of the microstructure can be discriminated based on the contrast. Thus, pearlite and pro-eutectoid cementite are identified based on contrast. The area fraction (%) of pearlite is determined based on the total area of the identified pearlite and the area of the observation visual field (40,000 μm$^2$). The area fraction (%) of pro-eutectoid cementite is determined based on the total area of the identified pro-eutectoid cementite and the area of the observation visual field (40,000 μm$^2$).

[Morphology of Pro-Eutectoid Cementite]

(A) Specification Using the Average Value of the Width W of Pro-Eutectoid Cementite as an Index In the railway wheel 1 of the present embodiment, the pearlite area fraction is 85.0% or more and the area fraction of pro-eutectoid cementite is 0.90 to 15.00% in the microstructure of the web part 3. In other words, the pro-eutectoid cementite is present in the web part 3. However, as will be described later, since the average value of the width W of the pro-eutectoid cementite is 0.95 μm or less, the railway wheel 1 of the present embodiment exhibits excellent toughness.

[Average Value of the Width W of the Pro-Eutectoid Cementite of Web Part 3]

Further, in the railway wheel of the present embodiment, the average value of the width W of the pro-eutectoid cementite defined by Formula (3) is 0.95 μm or less, at least in the microstructure of the web part:

$$W = 1/2 \times (P/2 - ((P/2)^2 - 4A)^{1/2}) \quad (3)$$

where, A in Formula (3) is the area of pro-eutectoid cementite (μm$^2$), and P is the outer circumference length (μm) of pro-eutectoid cementite.

As described above, referring to FIG. 1, the thickness T3 of the web part 3 is the thinnest among those of the rim part 4, the web part 3, and the hub part 2 of the railway wheel 1. Therefore, in the railway wheel 1, the web part 3 is required to have high toughness. In the microstructure of the web part 3, if the average value of the width W of the pro-eutectoid cementite defined by Formula (3) is 0.95 μm or less, the toughness is remarkably raised high as shown in FIG. 11. Therefore, at least in the microstructure of the web part 3 of the railway wheel of the present embodiment, the average value of the width W of the pro-eutectoid cementite defined by Formula (3) is 0.95 μm or less. The upper limit of the average value of the width W of the pro-eutectoid cementite is preferably 0.90 μm, more preferably 0.85 μm, further preferably 0.80 μm, further preferably 0.75 μm, further preferably less than 0.70 μm, further preferably 0.68 μm, and further preferably 0.65 μm.

The average value of the width W of the pro-eutectoid cementite is determined by the following method. A microstructure photographic image (observation visual field: 200 μm×200 μm) of the web part 3 obtained by using the above described optical microscope is prepared. The binarization process is performed on the photographic image by well-known image processing. FIG. 15 is a diagram to show a microstructure photographic image obtained by using an optical microscope, and an image after the binarization process. Referring to FIG. 15, in the microstructure photographic images of Mark A and Mark B, black regions are pro-eutectoid cementite and light gray regions other than that are pearlite. The image obtained by binarizing each of these microstructure photographic images by the image processing is shown in the "binarization" column of FIG. 15. In the images in the binarization column, pro-eutectoid cementite is shown in white and pearlite is shown in black. However, in the binarization process, pro-eutectoid cementite may be shown in black and pearlite may be shown in white. The binarization process can be performed by, for example, a well-known image processing application such as ImageJ™. Note that although the number of pixels of an image is not particularly limited, a range of the number of pixels of an image is preferably 300,000 pixels or more, more preferably 400,000 pixels or more, and further preferably 500,000 pixels or more. The upper limit of the number of pixels is, though not particularly limited, for example, 2 million pixels, and may be 1.2 million pixels, or 1 million pixels.

In an image after the binarization process, individual pro-eutectoid cementite is identified. At this time, regions which are continuously linked are identified as one grain of cementite. The area A (μm$^2$) of each identified pro-eutectoid cementite is determined. Further, the outer circumference length P (μm) of each identified pro-eutectoid cementite is determined. The area A and the outer circumference length P can be determined by, for example, a well-known image processing application such as ImageJ™. In each identified pro-eutectoid cementite, one having an area A of less than 0.80 μm$^2$ is excluded because it may be noise. In other words, pro-eutectoid cementite having an area A of 0.80 μm$^2$ or more is targeted. The area A and the outer circumference length P of each targeted pro-eutectoid cementite are determined. An average value of the areas A of all of the targeted pro-eutectoid cementite is determined, and an average value of the outer circumference lengths P is determined. Using the determined average value of the area A and the determined average value of the outer circumference length P, a width W of the pro-eutectoid cementite defined by Formula (3) is determined. The determined pro-eutectoid cementite width W is regarded as the average value of the width W of the pro-eutectoid cementite. The average value of the width W of the pro-eutectoid cementite of Mark A in FIG. 15 is 0.52 μm, and the average value of width W of the pro-eutectoid cementite of Mark B is 0.95 μm.

As described above, in the railway wheel 1 of the present embodiment, the pearlite area fraction is 85.0% or more and the area fraction of pro-eutectoid cementite is 0.90 to 15.00% in the microstructure of the web part 3. Moreover, the average value of the width W of the pro-eutectoid cementite is 0.95 μm or less. In the railway wheel 1 of the present embodiment, pro-eutectoid cementite is present in the web part 3. However, since the average value of the width W of the pro-eutectoid cementite of the web part 3 is 0.95 μm or less, the railway wheel 1 of the present embodiment exhibits excellent toughness.

[Preferable Average Value of the Width W of the Pro-Eutectoid Cementite of Hub Part 2]

Preferably, even in the microstructure of the hub part 2 of the railway wheel 1 of the present embodiment, the pearlite area fraction is 85.0% or more, the area fraction of pro-eutectoid cementite is 0.90 to 15.00%, and the average value of the width W of the pro-eutectoid cementite is 0.95 μm or less. In this case, the railway wheel 1 exhibits further excellent toughness. The upper limit of the average value of the width W of the pro-eutectoid cementite in the hub part 2 is preferably 0.90 μm, more preferably 0.85 μm, further preferably 0.80 μm, further preferably 0.75 μm, further preferably less than 0.70 μm, further preferably 0.68 μm, and further preferably 0.65 μm.

Note that the average value of the width W of the pro-eutectoid cementite in the hub part 2 can be determined by the same method as the method for determining the average value of the width W of the pro-eutectoid cementite in the web part 3 by using the microstructure photographic image of the hub part (observation visual field: 200 μm×200 μm) obtained by the above described optical microscope.

(B) Specification Using the Maximum Width of Pro-Eutectoid Cementite as an Index In the railway wheel 1 according to the present embodiment, the pro-eutectoid cementite in the web part 3 can be defined not by the above described average value of the width W, but by the maximum width of pro-eutectoid cementite. In this case, in the microstructure of the web part 3 of the railway wheel 1 of the present embodiment, the area fraction of pearlite is 85.0% or more, the area fraction of pro-eutectoid cementite is 0.90 to 15.00%, and the maximum width of pro-eutectoid cementite is 1.80 μm or less.

As described above, referring to FIG. 1, the thickness T3 of the web part 3 is the thinnest among those of the rim part 4, the web part 3, and the hub part 2 of the railway wheel 1. Therefore, in the railway wheel 1, the web part 3 is required to have high toughness. In the microstructure of the web part 3, when the maximum width of pro-eutectoid cementite is 1.80 μm or less, the toughness is remarkably improved. Therefore, the maximum width of pro-eutectoid cementite is 1.80 μm or less at least in the microstructure of the web part 3 of the railway wheel of the present embodiment. The upper limit of the maximum width of pro-eutectoid cementite is preferably 1.75 μm, more preferably 1.70 μm, further preferably 1.60 μm, further preferably 1.50 μm, further preferably 1.40 μm, further preferably 1.30 μm, further preferably 1.20 μm, and further preferably 1.10 μm.

The maximum width of pro-eutectoid cementite is determined by the following method. A sample is collected from a middle position of an arbitrary thickness of the web part 3 (middle position of the thickness T3 of the web part 3 in FIG. 1). Of the surfaces of the sample, any surface is used as the observation surface. The observation surface is mirror-finished by mechanical polishing. Thereafter, the observation surface is etched with a nital solution. Arbitrary 8 visual fields of the observation surface of the sample after etching are observed at a magnification of 2000 times by using a scanning electron microscope (SEM) to produce a microstructure photographic image, which is a secondary electron image, of each visual field (60 μm×45 μm). Note that although the number of pixels of the image is not particularly limited, a range of the number of pixels of an image is preferably 300,000 pixels or more, more preferably 400,000 pixels or more, and further preferably 500,000 pixels or more. The upper limit of the number of pixels is, though not particularly limited, for example, 3 million pixels, and may be 2 million pixels or 1.5 million pixels.

The microstructure photographic image is binarized by image processing to identify pro-eutectoid cementite. The identified pro-eutectoid cementite is subjected to the thinning process to identify the skeleton line of pro-eutectoid cementite. Of a straight line perpendicular to the skeleton line from any measurement point of the skeleton line, a line segment length between two intersection points with the contour of pro-eutectoid cementite is defined as the width of pro-eutectoid cementite at that measurement point. At this time, referring to FIG. 14, the width of pro-eutectoid cementite at a measurement point, which is located within a range of a reference circle Cref with a diameter of 1.5 μm from a branch point of the skeleton line, and the width of pro-eutectoid cementite when the line segment at a measurement point intersects with the skeleton line at two or more points including the measurement point, are excluded.

With the width of pro-eutectoid cementite at a measurement point, which is located within a range of a reference circle Cref with a diameter of 1.5 μm from a branch point of the skeleton line, and the width of pro-eutectoid cementite when the line segment at a measurement point intersects with the skeleton line at two or more points including the measurement point being excluded, a maximum value of the width of pro-eutectoid cementite is identified in each visual field. Among the maximum values of the width of pro-eutectoid cementite of 8 visual fields, the largest width is defined as the maximum width of pro-eutectoid cementite.

Preferably, even in the microstructure of the hub part 2 of the railway wheel 1 of the present embodiment, the pearlite area fraction is 85.0% or more, the area fraction of pro-eutectoid cementite is 0.90 to 15.00%, and the maximum width of pro-eutectoid cementite is 1.80 μm or less. In this case, the railway wheel 1 exhibits further excellent toughness. The upper limit of the maximum width of pro-eutectoid cementite in the hub part 2 is preferably 1.75 μm, more preferably 1.70 μm, further preferably 1.60 μm, further preferably 1.50 μm, further preferably 1.40 μm, further preferably 1.30 μm, further preferably 1.20 μm, and further preferably 1.10 μm.

[Production Method of Railway Wheel]

One example of a method for producing the above described railway wheel will be described. This production method includes a step of producing railway wheel steel (starting material production step), a step of forming an intermediate product having a wheel shape from the railway wheel steel (forming step), a step of performing heat treatment (tread quenching) for the formed intermediate product (heat treatment step), and a step of obtaining a railway wheel by removing a quenched layer from a tread etc., of the intermediate product after the heat treatment (cutting step). Hereinafter, each step will be described.

[Starting Material Production Step]

In the starting material production step, molten steel having the above described chemical composition are melted by using an electric furnace or a converter, etc., and thereafter cast to obtain steel ingots. Note that the steel ingot may be either a cast piece by continuous casting, or an ingot cast with a mold.

The cast piece or ingot is subjected to hot working to produce a steel material for railway wheel having a desired size. Examples of hot working include hot forging, hot rolling, and others. When the steel material for railway wheel is produced by hot rolling, for example, the steel material for railway wheel is produced by the following method. In the hot rolling, for example, a blooming mill is used. A blooming mill is used to perform blooming on the starting material to produce a steel material for railway wheel. When a continuous rolling mill is installed in the downstream of the blooming mill, the steel material after blooming may be further subjected to hot rolling by use of the continuous rolling mill to produce a steel material for railway wheel. In the continuous rolling mill, a horizontal stand having a pair of horizontal rolls and a vertical stand having a pair of vertical rolls are alternately arranged in a row. The heating temperature of the heating furnace in the hot rolling is, although not particularly limited, for example, 1100 to 1350° C. The steel material for railway wheel is produced by the above described production process.

Note that the steel material for railway wheel may be a cast material (cast piece or ingot). In other words, the above described hot working step may be omitted. According to the process described above, a steel material for railway wheel which is the starting material for a railway wheel is produced.

[Forming Step]

In the forming step, an intermediate product having a wheel shape is formed by hot working by using the prepared steel material for railway wheel. Since the intermediate product has a wheel shape, it includes a hub part, a web part, and a rim part including a tread and a flange part. Examples of the hot working include hot forging, hot rolling, and the like. For example, an intermediate product having a rough wheel shape is formed by hot forging. Hot rolling using a wheel rolling mill is performed on the rough intermediate product after preform forging. Rotary forging is performed on the rough intermediate product after hot rolling to form a through hole in a central portion corresponding to the hub part. According to the above configuration, a wheel-shaped intermediate product is formed by hot working.

The heating temperature of the steel material for railway wheel during hot working in the forming step is preferably 1220° C. or more. In this case, the lower limit of the heating temperature during hot working is preferably 1230° C., more preferably 1250° C., and further preferably 1300° C. The upper limit of the heating temperature during hot working is preferably 1350° C.

Note that the cooling method of the intermediate product after the hot working will not be particularly limited. It may be allowed to cool in the air, or may be water cooled.

[Heat Treatment Step]

In the heat treatment step, the formed intermediate product having a wheel shape is subjected to tread quenching. Specifically, the intermediate product after the hot working (hot forging or hot rolling) is reheated to $Ac_m$ transformation point or higher (reheating treatment). After heating, the tread and the flange part of the intermediate product are subjected to rapid cooling (tread quenching). At this time, it is not necessary to rapidly cool the web part 3, and an average cooling rate $CR_{800-500}$ from 800° C. to 500° C. in the web part 3 may be less than 0.500° C./sec. However, an average cooling rate $CR_{750-700}$ from 750° C. to 700° C. in the web part 3 is made 0.022° C./sec or more.

In the intermediate product of the railway wheel 1 having the above described chemical composition, the temperature range of 750 to 700° C. is a temperature range in which pro-eutectoid cementite precipitates. When the average cooling rate $CR_{750-700}$ is 0.022° C./sec or more, the average value of the width W of pro-eutectoid cementite in the web part 3 will be 0.95 µm or less, and the maximum width of pro-eutectoid cementite will be 1.80 µm or less. In this case, the toughness of the railway wheel is excellent.

If the average cooling rate $CR_{750-700}$ from 750° C. to 700° C. in the web part 3 is 0.022° C./sec or more, formation of excessive pro-eutectoid cementite will be suppressed even when the average cooling rate $CR_{800-500}$ from 800° C. to 500° C. in the web part 3 is less than 0.500° C./sec. As a result, the average value of the width W of pro-eutectoid cementite in the web part 3 will be 0.95 µm or less. Further, the maximum width of pro-eutectoid cementite in the web part 3 will be 1.80 µm or less. The lower limit of the average cooling rate $CR_{750-700}$ in the web part 3 is preferably 0.025° C./sec, more preferably 0.030° C./sec, further preferably 0.040° C./sec, further preferably 0.045° C./sec, further preferably 0.050° C./sec, further preferably 0.052° C./sec, further preferably 0.055° C./sec, further preferably 0.100° C./sec, and further preferably 0.500° C./sec.

If the average cooling rate $CR_{750-700}$ is more than 33.000° C./sec, the average cooling rate $CR_{800-500}$ will also be 0.500° C./sec or more. In this case, the formation of pro-eutectoid cementite is suppressed, and the area fraction of pro-eutectoid cementite can be made less than 0.90% in a steel material having the above described chemical composition. However, it is necessary to improve the cooling capacity of a cooling apparatus at the time of tread quenching, which increases the equipment cost. If the cooling rate is increased, a quenching layer may be formed not only in the tread surface but also in the surfaces of the web part 3 and the hub part 2. It is preferable that the formation of the quenched layer in the web part 3 and the hub part 2 can be suppressed. Therefore, if the area fraction of pro-eutectoid cementite is to be made less than 0.90%, it is necessary to strictly adjust the cooling rate of the web part 3 while also considering suppression of the formation of the quenched layer. The railway wheel 1 in the present embodiment is premised on the presence of pro-eutectoid cementite at least in the web part 3. Therefore, there is no need of strictly controlling the cooling rate in the web part 3, such as suppressing the formation of pro-eutectoid cementite, as well as suppressing the formation of the quenched layer. As a result, the complexity of the production process can be suppressed.

Figure 16:
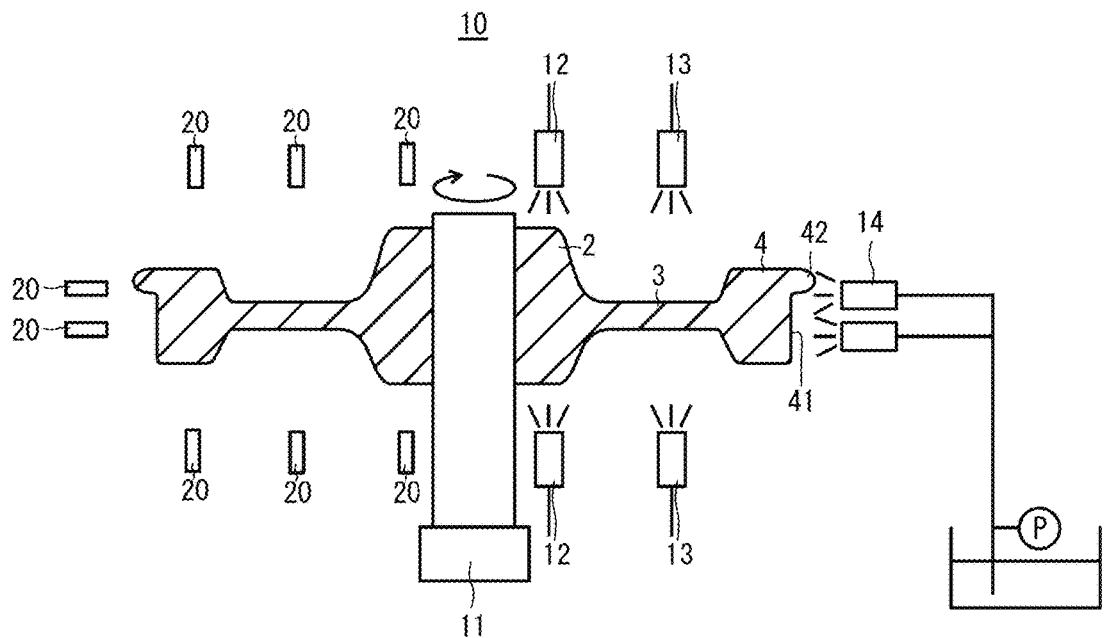
FIG. 16 is a diagram to show an example of cooling apparatus for cooling an intermediate product.

FIG. 16 is a diagram to show an example of a cooling apparatus for cooling the intermediate product. A cooling apparatus 10 includes a rotating apparatus 11 having a rotational shaft, one or more cooling nozzles for hub-part 12, one or more cooling nozzles for web-part 13, and one or more cooling nozzles for tread 14. The cooling nozzle for tread 14 is arranged around the rotational shaft of the cooling apparatus 10. A nozzle port of the cooling nozzle for tread 14 is arranged so as to be opposed to the tread 41 of the intermediate product. The nozzle port of the cooling nozzle for tread 14 may be arranged so as to be opposed to the surface of a flange part 42 of the intermediate product. The cooling nozzle for web-part 13 is arranged so as to be opposed to the surface of the web part 3. The cooling nozzle for hub-part 12 is arranged so as to be opposed to the surface of the hub part 2.

The cooling nozzle for tread 14 injects a cooling liquid from the nozzle port to mainly cool the surfaces of the tread 41 of the rim part 4 and the surface of the flange part 42. The cooling liquid is, for example, water, mist, spray and the like. On the other hand, the cooling nozzle for web-part 13 injects cooling gas from the nozzle port to mainly cool the web part 3. The cooling gas is, for example, compressed air and the like. Similarly to the cooling nozzle for web-part 13, the cooling nozzle for hub-part 12 also injects cooling gas from the nozzle port to mainly cool the hub part 2.

The cooling apparatus 10 further includes a plurality of thermometers 20. The thermometer 20 is arranged around the intermediate product and measures temperatures of the rim part 4, the tread 41, the flange part 42, the web part 3, and the hub part 2. In FIG. 16, the plurality of thermometers 20 are arranged so as to be able to measure temperature distributions on the tread 41, the surface of the flange part 42, the surface of the rim part 4 other than the tread 41 or the surface of the flange part 42 (for example, a side surface of the rim part 4), the surface of the web part 3, and the surface of the hub part 2.

The intermediate product heated to or above the $A_{cm}$ transformation point is placed in the cooling apparatus 10. While rotating the intermediate product by the rotating apparatus 11, the cooling liquid is injected from the cooling nozzle for tread 14 to perform tread quenching. Further, during the tread quenching, the web part 3 and/or the hub part 2 is cooled by injecting a cooling gas from the cooling nozzle for web-part 13 and/or the cooling nozzle for hub-part 12. While measuring the temperature distribution of the intermediate product with the thermometers 20, adjustment is made such that the cooling rate from 750 to 700° C. in the web part 3 is 0.022 to 33.000° C./sec.

As a result of the tread quenching, fine pearlite is formed on the outer layer of the tread 41. The C content of the railway wheel 1 of this embodiment is as high as 0.80 to 1.60%. Therefore, the wear resistance of fine pearlite is improved. Further, at the time of the tread quenching, adjustment is made such that the average cooling rate $CR_{750-700}$ from 750 to 700° C. is 0.022 to 33.000° C./sec in the web part 3. In this case, although the pearlite area fraction will be 85.0% or more, and the area fraction of pro-eutectoid cementite will be 0.90 to 15.00% at least in the microstructure of the web part 3, the average of the width W of pro-eutectoid cementite can be made 0.95 µm or less. Further, the maximum width of pro-eutectoid cementite can be made 1.80 µm or less. Therefore, although pro-eutectoid cementite is present in the microstructure, sufficient toughness can be achieved.

When the pearlite area fraction is made 85.0% or more, and the area fraction of pro-eutectoid cementite is made 0.90 to 15.00%, and the average value of the width W of pro-eutectoid cementite is made 0.95 μm or less, or the maximum width of pro-eutectoid cementite is made 1.80 μm or less, in the microstructure of not only the web part 3, but also the hub part 2; the average cooling rate $CR_{750-700}$ from 750 to 700° C. in the web part 3 is made 0.022 to 33.000° C./sec, and the average cooling rate $CR_{750-700}$ from 750 to 700° C. in the hub part 2 is also made 0.022 to 33.0° C./sec even if the average cooling rate $CR_{800-500}$ from 800 to 500° C. in the web part 3 and the hub part 2 is less than 0.500° C./sec. In this case, in the microstructure of the web part 3, the pearlite area fraction will be 85.0% or more, the area fraction of pro-eutectoid cementite will be 0.90 to 15.00%, and the average value of the width W of pro-eutectoid cementite will be 0.95 μm or less, as well as in the microstructure of the hub part 2, the pearlite area fraction will be 85.0% or more, the area fraction of pro-eutectoid cementite will be 0.90 to 15.00%, and the average value of the width W of pro-eutectoid cementite will be 0.95 μm or less. Further, in the microstructure of the web part 3, the pearlite area fraction will be 85.0% or more, the area fraction of pro-eutectoid cementite will be 0.90 to 15.00%, and the maximum width of pro-eutectoid cementite will be 1.80 μm or less, as well as in the microstructure of the hub part 2, the pearlite area fraction will be 85.0% or more, the area fraction of pro-eutectoid cementite will be 0.90 to 15.00%, and the maximum width of pro-eutectoid cementite will be 1.80 μm or less.

Although the cooling apparatus 10 described above includes the cooling nozzle for web-part 13 and the cooling nozzle for hub-part 12, the cooling apparatus 10 may not include the cooling nozzle for hub-part 12. Further, the cooling apparatus 10 may include the cooling nozzle for tread 14, and may not include the cooling nozzle for web-part 13 or the cooling nozzle for hub-part 12. In this case, by adjusting an injection amount of the cooling liquid of the cooling nozzle for tread 14 at the time of the tread quenching, the average cooling rate $CR_{750-700}$ from 750 to 700° C. in the web part 3, or in the web part 3 and the hub part 2 can be adjusted to 0.022 to 33.000° C./sec.

In the above description, the intermediate product is reheated, but the intermediate product after the hot working may be directly subjected to the tread quenching (without being reheated).

The intermediate product after the tread quenching is subjected to tempering as necessary. It is sufficient if the tempering is performed at a well-known temperature and time. The tempering temperature is, for example, 400 to 600° C.

[Cutting Step]

As described above, while fine pearlite is formed in the outer layer of the tread of the intermediate product after the heat treatment, a quenched layer is formed in the layer thereabove. Since the wear resistance of the quenched layer is poor in uses of railway wheel, the quenched layer is removed by cutting. It is sufficient if the cutting is performed by a well-known method.

The railway wheel of the present embodiment is produced by the above described process. In the railway wheel of the present embodiment produced in the above described production process, at least in the microstructure of the web part 3, the pearlite area fraction is 85.0% or more, the area fraction of pro-eutectoid cementite is 0.90 to 15.00%, and the average value of the width W of pro-eutectoid cementite defined by Formula (3) is 0.95 μm or less. Alternatively, the maximum width of pro-eutectoid cementite is 1.80 μm or less. Preferably, in the railway wheel of the present embodiment, in the microstructure of the web part 3, the pearlite area fraction is 85.0% or more, the area fraction of pro-eutectoid cementite is 0.90 to 15.00%, and the average value of the width W of pro-eutectoid cementite defined by Formula (3) is 0.95 μm or less; and in the microstructure of the hub part 2, the pearlite area fraction is 85.0% or more, the area fraction of pro-eutectoid cementite is 0.90 to 15.00%, and the average value of the width W of pro-eutectoid cementite defined by Formula (3) is 0.95 μm or less. For that reason, in the railway wheel of the present embodiment, even though pro-eutectoid cementite is present, sufficient toughness can be achieved.

Moreover, in the railway wheel of the present embodiment produced in the above described production process, at least in the microstructure of the web part 3, the pearlite area fraction is 85.0% or more, the area fraction of pro-eutectoid cementite is 0.90 to 15.00%, and the maximum width of pro-eutectoid cementite is 1.80 μm or less. Preferably, in the railway wheel of the present embodiment, in the microstructure of the web part 3, the pearlite area fraction is 85.0% or more, the area fraction of pro-eutectoid cementite is 0.90 to 15.00%, and the maximum width of pro-eutectoid cementite is 1.80 μm or less, as well as in the microstructure of the hub part 2, the pearlite area fraction is 85.0% or more, the area fraction of pro-eutectoid cementite is 0.90 to 15.00%, and the maximum width of pro-eutectoid cementite is 1.80 μm or less. For that reason, in the railway wheel of the present embodiment, even though pro-eutectoid cementite is present, sufficient toughness can be achieved.

EXAMPLES

Molten steels of Steel No. A to F having chemical compositions shown in Table 3 were produced.

TABLE 3

| Steel Number | Chemical Composition (unit is mass %, the balance is Fe and impurities) | | | | | | | | |
|---|---|---|---|---|---|---|---|---|---|
| | C | Si | Mn | P | S | Al | N | Cr | V |
| A | 0.93 | 0.29 | 0.80 | 0.001 | 0.002 | 0.032 | 0.0042 | 0.00 | 0.00 |
| B | 1.00 | 0.30 | 0.80 | 0.001 | 0.002 | 0.034 | 0.0040 | 0.00 | 0.00 |
| C | 1.09 | 0.30 | 0.79 | 0.001 | 0.002 | 0.036 | 0.0040 | 0.00 | 0.00 |
| D | 0.90 | 0.29 | 0.81 | 0.015 | 0.010 | 0.031 | 0.0041 | 0.08 | 0.00 |
| E | 0.99 | 0.29 | 0.79 | 0.013 | 0.010 | 0.034 | 0.0047 | 0.10 | 0.00 |
| F | 1.03 | 0.29 | 0.80 | 0.001 | 0.001 | 0.029 | 0.0048 | 0.00 | 0.03 |

An ingot (a truncated cone shape having an upper face diameter of 107 mm, a bottom face diameter of 97 mm, and a height of 230 mm) was produced by an ingot-making process by using the above described molten steel. Simulating the hot working step in the production process of railway wheel, the ingot was heated to 1250° C. and thereafter was hot forged to produce a round bar having a diameter of 40 mm. Further, from the central portion of the round bar, a round bar (steel material) having a diameter of 20 mm and a length of 125 mm was taken by machining.

[Simulated tread quenching test] A simulated tread quenching test which simulates the tread quenching in the production process of railway wheel was conducted for the steel materials of each test number. Specifically, the steel materials of each test number were subjected to heat treatment with the heat patterns shown in Table 4 and FIG. 17. In each heat pattern, the average cooling rate $CR_{800-500}$ (° C./sec) when the steel material temperature was 800 to 500° C., and the average cooling rate $CR_{750-700}$ (° C./sec) when the steel material temperature was 750 to 700° C. were as shown in Table 4. Through the above described production process, a steel material simulating a railway wheel was produced.

TABLE 4

| Test Number | Steel Number | Cooling Method | Average Cooling Rate $CR_{800-500}$ (° C./sec) | Average Cooling Rate $CR_{750-700}$ (° C./sec) | Pearlite Area Fraction (%) | Pro-eutectoid θ Area Fraction (%) | Pro-eutectoid θ Width W Average Value (μm) | Pro-eutectoid θ Maximum Width (μm) | Charpy Impact Value (J/cm$^2$) | Remarks |
|---|---|---|---|---|---|---|---|---|---|---|
| 1 | D | HP720 Rapid 650 | 0.175 | 0.048 | 98.1% | 1.90% | 0.81 | 1.34 | 9.2 | Inventive Example |
| 2 | D | HP720 Rapid 500 | 0.259 | 0.049 | 97.8% | 2.20% | 0.90 | 1.74 | 8.8 | Inventive Example |
| 3 | D | HP650 | 0.430 | 0.929 | 98.9% | 1.10% | 0.41 | 0.65 | 14.7 | Inventive Example |
| 4 | E | HP650 | 0.430 | 0.929 | 96.2% | 3.80% | 0.63 | 0.84 | 15.9 | Inventive Example |
| 5 | D | HP670 | 0.420 | 0.752 | 98.9% | 1.10% | 0.50 | 0.98 | 12.9 | Inventive Example |
| 6 | D | HP690 | 0.420 | 0.530 | 98.7% | 1.30% | 0.60 | 1.02 | 12.6 | Inventive Example |
| 7 | F | HP500 | 1.630 | 11.398 | 98.5% | 1.50% | 0.53 | 0.61 | 18.5 | Inventive Example |
| 8 | D | HP720 Slow 400 | 0.107 | 0.019 | 98.2% | 1.80% | 1.16 | 2.50 | 5.9 | Comparative Example |
| 9 | C | HP0.01 | 0.010 | 0.010 | 93.5% | 6.50% | 0.96 | 3.96 | 4.8 | Comparative Example |
| 10 | D | HP720 Slow 650 | 0.085 | 0.017 | 95.5% | 4.50% | 1.22 | 2.21 | 8.5 | Comparative Example |
| 11 | D | HP400 | 4.620 | 16.270 | 99.9% | 0.10% | — | — | 23.0 | Reference Example |
| 12 | D | HP500 | 1.630 | 11.398 | 99.9% | 0.10% | — | — | 17.1 | Reference Example |
| 13 | E | HP400 | 2.520 | 16.270 | 99.7% | 0.30% | — | — | 23.3 | Reference Example |
| 14 | A | HP550 | 0.908 | 33.500 | 100.0% | 0.00% | — | — | 20.8 | Reference Example |
| 15 | B | HP550 | 0.908 | 33.500 | 100.0% | 0.00% | — | — | 13.9 | Reference Example |

Figure 17:
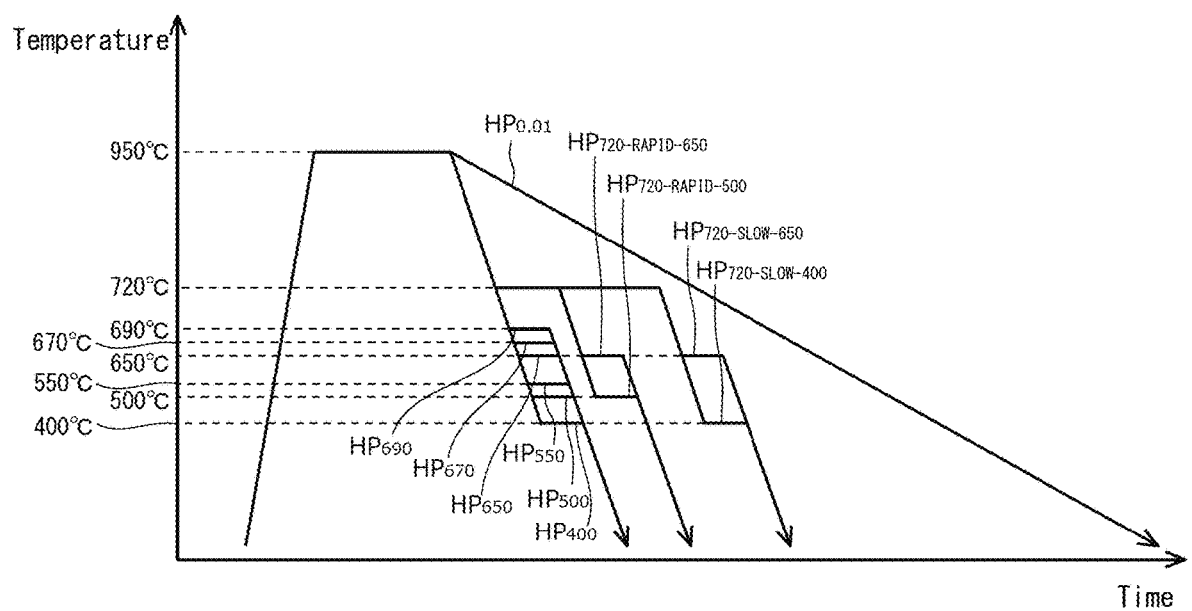
FIG. 17 is a diagram to show heat patterns in a heat treatment simulating tread quenching, which is adopted in Examples.

In FIG. 17, for example, in "HP690", the average cooling rate $CR_{800-500}$ was adjusted to 0.420° C./sec, and the average cooling rate $CR_{750-700}$ was adjusted to 0.530° C./sec by starting cooling from 950° C., holding at 690° C. for a predetermined time, and then restarting cooling. In the "HP720 Rapid 650", the average cooling rate $CR_{800-500}$ was adjusted to 0.175° C./sec and the average cooling rate $CR_{750-700}$ was adjusted to 0.0480° C./sec by starting cooling from 950° C., holding at 720° C. for a predetermined time, then restarting cooling, holding at 650° C. for a predetermined time, and then restarting cooling.

[Measurement of Pearlite Area Fraction and Pro-Eutectoid Cementite Area Fraction]

A test specimen for microstructure observation was collected from the central position of the cross section perpendicular to the longitudinal direction of the simulated railway wheel steel material of each test number after the heat treatment. Of the surface of the test specimen, the cross section perpendicular to the longitudinal direction of the test material was used as the observation surface. The observation surface of each test specimen was mirror-finished by mechanical polishing. Then, the observation surface was etched with a sodium picric acid solution (100 ml of water+2 g of picric acid+25 g of sodium hydroxide). In the etching, the test specimen was immersed in a boiled sodium picric acid solution. A photographic image for microstructure observation was obtained using an optical microscope with a magnification of 500 times for arbitrary one visual field (200 μm×200 μm) in the observation surface of the test specimen after etching. In the visual field, pearlite, pro-eutectoid cementite, and other phases (martensite, bainite) differed in contrast, as described above. Therefore, pearlite and pro-eutectoid cementite were identified based on the contrast of the photographic image. The area fraction (%) of pearlite was determined based on the total area of the identified pearlite and the area of the observation visual field. In addition, the area fraction (%) of the pro-eutectoid cementite was determined based on the total area of the identified pro-eutectoid cementite and the area of the observation visual field. Table 4 shows the obtained pearlite area fraction and the pro-eutectoid cementite area fraction.

[Measurement of Average Value of the Width W of the Pro-Eutectoid Cementite]

A photographic image for observing the microstructure in arbitrary one visual field (200 μm×200 μm) in the observation surface of the test specimen after etching described above was binarized using the image processing application ImageJ™ to identify individual pro-eutectoid cementite in the visual field (photographic image). The area A (μm$^2$) of each identified pro-eutectoid cementite was determined. Furthermore, the outer circumference length P (μm) of each identified pro-eutectoid cementite was determined. The area A and the outer circumference length P of each pro-eutectoid cementite were determined using the above described image processing application. In each of the identified pro-eutectoid cementite, one having an area A of less than 0.80 μm$^2$ were excluded because it may be noise. The area A and the outer circumference length P of each pro-eutectoid cementite to be targeted were determined. The average value of the areas A of all the targeted pro-eutectoid cementite was determined, and the average value of the outer circumference length P was determined. Using the determined average value of the area A, and the determined average value of the outer circumference length P, the width W of the pro-eutectoid cementite defined by Formula (3) was determined. The determined pro-eutectoid cementite width W was regarded as the average value of width W of the pro-eutectoid cementite. Table 4 shows the average value (μm) of the determined pro-eutectoid cementite width W. In Test Numbers 12 to 16, since the area fraction of the pro-eutectoid cementite was extremely small, the calculation of the average value of the width W of pro-eutectoid cementite was omitted (indicated as "-" in Table 4).

[Measurement of Maximum Width of Pro-Eutectoid Cementite]

The above described observation surface was subjected to etching with a nital solution after being mirror-finishing by mechanical polishing. Arbitrary 8 visual fields in the observation surface of the test specimen after the etching were observed at a magnification of 2000 times using a scanning electron microscope (SEM), and a microstructure photographic image, which is a secondary electron image, of each visual field (60 μm×45 μm) were produced. The photographic image for microstructure observation was binarized using the image processing application ImageJ™ to identify individual pro-eutectoid cementite in the visual field (photographic image). Then, after identifying pro-eutectoid cementite in the microstructure photographic image by the binarization process, the identified pro-eutectoid cementite was subjected to a thinning process to obtain a skeleton line of pro-eutectoid cementite.

Of the straight line perpendicular to the skeleton line from any measurement point on the skeleton line, the line segment length between two intersection points with the contour of the pro-eutectoid cementite is defined as the width of pro-eutectoid cementite at that measurement point. At this time, the width of pro-eutectoid cementite at a measurement point, which was located within a range of a reference circle Cref with a diameter of 1.5 μm from a branch point of the skeleton line, and the width of pro-eutectoid cementite when the line segment at a measurement point intersected with the skeleton line at two or more points including the measurement point, were excluded.

With the width of the pro-eutectoid cementite at the measurement point within the range of the reference circle Cref with a diameter of 1.5 μm from the branch point of the skeleton line, and the width of pro-eutectoid cementite when the line segment at a measurement point intersects with the skeleton line at two or more points including the measurement point being excluded, a maximum value of the width of pro-eutectoid cementite was identified in each visual field. Of the maximum values of the width of pro-eutectoid cementite in the 8 visual fields, the largest width was defined as the maximum width of pro-eutectoid cementite. Table 4 shows the determined maximum width (μm) of pro-eutectoid cementite. In Test Numbers 12 to 16, since the area fraction of pro-eutectoid cementite was extremely small, the calculation of the maximum width of pro-eutectoid cementite was omitted (indicated as "-" in Table 4).

[Charpy Impact Test]

A U-notch test specimen conforming to JIS Z 2242 (2005) was collected from the central position of the cross section perpendicular to the longitudinal direction of the simulated railway wheel steel material of each test number. The cross section perpendicular to the longitudinal direction of the U-notch test specimen was a square of 10 mm×10 mm, and the length of the U-notch test specimen in the longitudinal direction was 55 mm. The longitudinal direction of the U-notch test specimen was parallel to the longitudinal direction of the steel material. A U-notch was formed at the middle position of the length of the U-notch test specimen (that is, the middle position of a length of 55 mm). The notch depth was 2 mm and the notch bottom radius was 1.0 mm. A Charpy impact test was conducted at room temperature in the atmosphere conforming to JIS Z 2242 (2005). The Charpy impact value (J/cm$^2$) was determined for four U-notch test specimens, and the average value of the four was defined as the Charpy impact value (J/cm$^2$) of that test number. The obtained Charpy impact values are shown in Table 4.

[Test Results]

Test results are shown in Table 4. Referring to FIG. 4, chemical compositions of simulated railway wheel steel materials of Test Numbers 1 to 7 were appropriate. Further, in the heat treatment which simulated the tread quenching, the average cooling rate $CR_{800-500}$ (° C./sec) and the average cooling rate $CR_{750-700}$ (° C./sec) were appropriate. For that reason, the pearlite area fraction was 85.0% or more, and the area fraction of pro-eutectoid cementite was 0.90 to 15.00%. Further, the average value of the width W of pro-eutectoid cementite was 0.95 μm or less. Moreover, the maximum width of pro-eutectoid cementite was 1.80 μm or less. For that reason, the Charpy impact value was more than 8.5 J/cm$^2$, and thus excellent toughness was achieved.

On the other hand, in Test Numbers 8 to 10, although the chemical compositions were appropriate, the average cooling rate $CR_{750-700}$ was as low as 0.010 to 0.019° C./sec. For that reason, in the microstructure of the simulated railway wheel steel materials of these test numbers, the average value of the width W of pro-eutectoid cementite was more than 0.95 μm. In addition, the maximum width of pro-eutectoid cementite was more than 1.80 μm. For that reason, the Charpy impact value was 8.5 J/cm$^2$ or less. Note that in Test Numbers 11 to 15, the average cooling rate $CR_{800-500}$ was more than 0.500° C./sec, and further, in Test Numbers 14 and 15, the average cooling rate $CR_{750-700}$ was more than 33.000° C./sec. For that reason, the area fraction of pro-eutectoid cementite was less than 0.90%, which was out of the scope of the present invention.

Embodiments of the present invention have been described so far. However, the above described embodiments are merely examples for practicing the present invention. Therefore, the present invention will not be limited to the above described embodiments, and the present invention can be practiced by appropriately modifying the above described embodiments within a range not departing from the spirit thereof.

REFERENCE SIGNS LIST

1 Railway wheel
2 Hub part
3 Web part
4 Rim part
41 Tread
42 Flange part

The invention claimed is:

1. A railway wheel, comprising:
a rim part,
a hub part, and
a web part which is disposed between the rim part and the hub part and is linked to the rim part and the hub part, wherein
a chemical composition of the railway wheel consists of:
in mass %,
C: 0.80 to 1.60%,
Si: 1.00% or less,
Mn: 0.10 to 1.25%,
P: 0.050% or less,
S: 0.030% or less,
Al: 0.010 to 0.650%,
N: 0.0030 to 0.0200%,
Cr: 0 to 0.60%, and
V: 0 to 0.12%, with
the balance being Fe and impurities, and wherein
in a microstructure of the web part of the railway wheel,
an area fraction of pearlite is 85.0% or more, an area fraction of pro-eutectoid cementite is 0.90 to 15.00%, and an average value of a width W of the pro-eutectoid cementite defined by Formula (3) is 0.95 μm or less:

$$W = \tfrac{1}{2} \times (P/2 - ((P/2)^2 - 4A)^{1/2}) \qquad (3)$$

where, A in Formula (3) is an area (μm$^2$) of the pro-eutectoid cementite, and P is a circumference length (μm) of the pro-eutectoid cementite.

2. The railway wheel according to claim 1, wherein in a microstructure of the hub part of the railway wheel, an area fraction of pearlite is 85.0% or more, an area fraction of the pro-eutectoid cementite is 0.90 to 15.00%, and an average value of a width W of the pro-eutectoid cementite defined by Formula (3) is 0.95 μm or less.

3. The railway wheel according to claim 2, wherein the chemical composition contains one or more elements selected from the group consisting of:
Cr: 0.02 to 0.60%, and
V: 0.02 to 0.12%.

4. The railway wheel according to claim 1, wherein the chemical composition contains one or more elements selected from the group consisting of:
Cr: 0.02 to 0.60%, and
V: 0.02 to 0.12%.

5. A railway wheel comprising:
a rim part,
a hub part, and
a web part which is disposed between the rim part and the hub part and is linked to the rim part and the hub part, wherein
a chemical composition of the railway wheel consists of, in mass %,
C: 0.80 to 1.60%,
Si: 1.00% or less,
Mn: 0.10 to 1.25%,
P: 0.050% or less,
S: 0.030% or less,
Al: 0.010 to 0.650%,
N: 0.0030 to 0.0200%,
Cr: 0 to 0.60%, and
V: 0 to 0.12%, with
the balance being Fe and impurities, and wherein
in a microstructure of the web part of the railway wheel, an area fraction of pearlite is 85.0% or more, an area fraction of pro-eutectoid cementite is 0.90 to 15.00%, and a maximum width of the pro-eutectoid cementite is 1.80 µm or less.

6. The railway wheel according to claim 5, wherein
in a microstructure of the hub part of the railway wheel, an area fraction of pearlite is 85.0% or more, an area fraction of the pro-eutectoid cementite is 0.90 to 15.00%, and a maximum width of the pro-eutectoid cementite is 1.80 µm or less.

7. The railway wheel according to claim 6, wherein the chemical composition contains one or more elements selected from the group consisting of:
Cr: 0.02 to 0.60%, and
V: 0.02 to 0.12%.

8. The railway wheel according to claim 5, wherein the chemical composition contains one or more elements selected from the group consisting of:
Cr: 0.02 to 0.60%, and
V: 0.02 to 0.12%.

* * * * *